(12) United States Patent
Christie et al.

(10) Patent No.: US 11,642,280 B2
(45) Date of Patent: May 9, 2023

(54) GLASS CONTAINERS AND SEALING ASSEMBLIES FOR MAINTAINING SEAL INTEGRITY AT LOW STORAGE TEMPERATURES

(71) Applicant: CORNING INCORPORATED, Corning, NY (US)

(72) Inventors: Dane Alphanso Christie, Big Flats, NY (US); Sinue Gomez-Mower, Corning, NY (US); Adam Robert Sarafian, Painted Post, NY (US); Robert Anthony Schaut, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/213,922

(22) Filed: Mar. 26, 2021

(65) Prior Publication Data

US 2021/0212893 A1 Jul. 15, 2021

Related U.S. Application Data

(60) Provisional application No. 63/111,718, filed on Nov. 10, 2020.

(51) Int. Cl.
*A61J 1/06* (2006.01)
*A61J 1/14* (2006.01)
(Continued)

(52) U.S. Cl.
CPC ............ *A61J 1/065* (2013.01); *A61J 1/1412* (2013.01); *B32B 17/06* (2013.01); *B65B 7/161* (2013.01);
(Continued)

(58) Field of Classification Search
CPC ...... A61J 1/065; A61J 1/1412; A61J 2200/44; B32B 17/06; B65B 7/161; B65B 7/2842;
(Continued)

(56) References Cited

U.S. PATENT DOCUMENTS

| 3,653,528 A | 4/1972 | Wimmer |
| 3,659,736 A | 5/1972 | Riggs |

(Continued)

FOREIGN PATENT DOCUMENTS

| CA | 3138450 A1 | 11/2020 | |
| EP | 3708137 A1 * | 9/2020 | .......... A61M 5/3129 |

(Continued)

OTHER PUBLICATIONS

Ethylene-Propylene Rubbers & Elastomers, Apr. 20, 2012, International Institute of Synthetic Rubber Producers, Inc. (Year: 2012).*

(Continued)

*Primary Examiner* — Eli D. Strah
*Assistant Examiner* — Thomas J Kessler
(74) *Attorney, Agent, or Firm* — F. Brock Riggs

(57) ABSTRACT

A sealed pharmaceutical container includes a shoulder, a neck extending from the shoulder, and a flange extending from the neck. The flange includes an inclined sealing surface defining an opening in the sealed pharmaceutical container. The sealed pharmaceutical container also includes a sealing assembly including a stopper extending over the sealing surface of the flange and a cap securing the stopper to the flange. The stopper has a glass transition temperature ($T_g$) that is greater than or equal to −70° C. and less than or equal to −45° C. The sealing assembly maintains a helium leakage rate of the sealed pharmaceutical container of less than or equal to $1.4 \times 10^{-6}$ cm$^3$/s as the sealed pharmaceutical container is cooled to a temperature of less than or equal to −45° C.

29 Claims, 12 Drawing Sheets

(51) Int. Cl.
- *B65D 39/00* (2006.01)
- *C03C 15/02* (2006.01)
- *B32B 17/06* (2006.01)
- *B65B 7/16* (2006.01)

(52) U.S. Cl.
CPC .......... *B65D 39/0052* (2013.01); *C03C 15/02* (2013.01); *A61J 2200/44* (2013.01); *Y10T 428/13* (2015.01); *Y10T 428/131* (2015.01); *Y10T 428/1328* (2015.01); *Y10T 428/1331* (2015.01); *Y10T 428/1352* (2015.01); *Y10T 428/1355* (2015.01); *Y10T 428/1397* (2015.01)

(58) Field of Classification Search
CPC .... B65D 39/0052; B65D 1/023; B65D 45/02; B65D 51/002; C03C 15/02; Y10T 428/13; Y10T 428/131; Y10T 428/1328; Y10T 428/1331; Y10T 428/1352; Y10T 428/1355; Y10T 428/1379; Y10T 428/1397

See application file for complete search history.

(56) References Cited

U.S. PATENT DOCUMENTS

| | | | |
|---|---|---|---|
| 4,205,754 A | 6/1980 | Jarsskov et al. | |
| 4,244,478 A | 1/1981 | Handman | |
| 4,664,277 A | 5/1987 | Connor | |
| 5,064,083 A | 11/1991 | Alexander et al. | |
| 5,817,082 A | 10/1998 | Niedospial, Jr. et al. | |
| 5,902,298 A | 5/1999 | Niedospial et al. | |
| 6,090,093 A * | 7/2000 | Thibault | A61J 1/2089 215/253 |
| 6,645,635 B2 | 11/2003 | Muraki | |
| 7,282,269 B2 | 10/2007 | Wang et al. | |
| 8,092,878 B2 | 1/2012 | Miller et al. | |
| 8,497,004 B2 * | 7/2013 | Davis | A61L 2/208 428/34.1 |
| 8,544,665 B2 | 10/2013 | Bogle et al. | |
| 8,551,898 B2 | 10/2013 | Danielson et al. | |
| 8,684,206 B2 | 4/2014 | Kawachi | |
| 9,080,044 B2 * | 7/2015 | Muto | C08L 47/00 |
| 9,145,329 B2 | 9/2015 | Drake et al. | |
| 10,780,021 B2 * | 9/2020 | Weikart | A61M 5/3129 |
| 11,168,019 B2 | 11/2021 | Schaut et al. | |
| 2002/0023409 A1 | 2/2002 | Py | |
| 2002/0166326 A1 | 11/2002 | Giesy et al. | |
| 2007/0246468 A1 | 10/2007 | Miller et al. | |
| 2009/0145427 A1 * | 6/2009 | Groeger | A61B 50/30 128/200.23 |
| 2010/0236659 A1 | 9/2010 | Py et al. | |
| 2010/0273049 A1 | 10/2010 | Vidal et al. | |
| 2015/0211950 A1 * | 7/2015 | Eckhoff | B65B 7/2821 206/438 |
| 2015/0344557 A1 * | 12/2015 | Malik | A61K 39/39591 424/142.1 |
| 2016/0009460 A1 | 1/2016 | Fournier et al. | |
| 2016/0075485 A1 | 3/2016 | Masuyama et al. | |
| 2016/0324723 A1 | 11/2016 | Lippert et al. | |
| 2018/0257975 A1 * | 9/2018 | Kimura | C03B 15/14 |
| 2020/0146280 A1 | 5/2020 | Silverman et al. | |
| 2020/0271541 A1 | 8/2020 | Mathaes et al. | |
| 2022/0168185 A1 | 6/2022 | Redkar et al. | |
| 2022/0339067 A1 | 10/2022 | Christie et al. | |

FOREIGN PATENT DOCUMENTS

| | | |
|---|---|---|
| FR | 2558444 A1 | 7/1985 |
| JP | 10-179688 A | 7/1998 |
| JP | 2010-209157 A | 9/2010 |
| WO | 2013/034594 A1 | 3/2013 |
| WO | 2020/112634 A1 | 6/2020 |
| WO | 2020/231474 A2 | 11/2020 |
| WO | 2021/042090 A2 | 3/2021 |
| WO | 2021/162984 A1 | 8/2021 |

OTHER PUBLICATIONS

Hagart-Alexander, C., Temperature Measurement, 2010, Elsevier Inc., pp. 269-271 (Year: 2010).*

Brigitte Zuleger et al., Container/Closure Integrity Testing and the Identification of a Suitable Vial/Stopper Combination for Low-Temperature Storage at -80° C., 2012, PDA JPST, vol. 66, Abstract (Year: 2012).*

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Mathaes, R., et al. (2016). "The pharmaceutical vial capping process: Container closure systems, capping equipment, regulatory framework, and seal quality tests", Elsevier, Eur J Pharm Biopharm 99 (2016) 54-64. DOI: http://dx.doi.org/10.1016/j.ejpb.2015.11.016.

Nieto, A. and H. Roehl (2018). "Sealing Behaviour of Container Closure Systems under Frozen Storage Conditions Nonlinear Finite Element Simulation of Serum Rubber Stoppers." PDA J Pharm Sci and Tech (2018), 72(4): 367-381. DOI: 10.5731/pdajpst.2017.008391.

Invitation to Pay Additional Fees; PCT/US21/58243; dated Feb. 22, 2020; pp. 10; International Searching Authority.

International Search Report and Written Opinion of the International Searching Authority; PCT/US2021/058243; dated Jun. 1, 2022, 19 pages; European Patent Office.

International Search Report and Written Opinion of the International Searching Authority; PCT/US2022/025278; dated Jul. 25, 2022, 13 pages; European Patent Office.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

International Search Report and Written Opinion of the International Searching Authority; PCT/US22/41311; dated Nov. 22, 2022, 14 pages; European Patent Office.

* cited by examiner

GLASS CONTAINERS AND SEALING ASSEMBLIES FOR MAINTAINING SEAL INTEGRITY AT LOW STORAGE TEMPERATURES

CROSS REFERENCE TO RELATED APPLICATIONS

The present application claims priority to U.S. Provisional Application No. 63/111,718 filed Nov. 10, 2020, entitled "Glass Containers and Sealing Assemblies for Maintaining Seal Integrity at Low Storage Temperatures," the entirety of which is incorporated by reference herein.

FIELD

The present specification generally relates to glass containers, such as glass containers for storing pharmaceutical compositions.

TECHNICAL BACKGROUND

Pharmaceutical containers, such as vials and syringes, are typically sealed via a stopper or other closure to preserve the integrity of the contained material. Closures are typically made of synthetic rubbers and other elastomers. Such materials beneficially have high permeation resistance and elasticity to facilitate insertion into the container to seal the container's interior. The elasticity of typically-used closure materials, however, may reduce at low temperatures. For example, synthetic rubbers currently in use as material closures may comprise transition temperatures that are greater than or equal to −70° C. and less than or equal to −45° C. Below the transition temperature, closures constructed of such synthetic rubbers may behave as a solid and be unable to expand elastically to compensate for the relatively large difference between coefficients of thermal expansion of the glass and a crimping cap used to secure the closure to the container. Given this, existing sealing assemblies for pharmaceutical containers may fail at temperatures less than or equal to −45° C.

Some biological materials (e.g., blood, serum, proteins, stem cells, and other perishable biological fluids) require storage at temperatures below the glass transition temperatures of conventional elastomers to remain useful. For example, certain RNA-based vaccines may require storage at dry-ice temperatures (e.g., approximately −80° C.) or liquid nitrogen temperatures (e.g., approximately −180° C.) to remain active. Such low temperatures may result in dimensional changes in the closure components (e.g., the glass or plastic container, the stopper, an aluminium cap), leading to issues in the integrity of the seal, and potential contamination of the material stored therein.

SUMMARY

A first aspect of the present disclosure includes a sealed pharmaceutical container including a shoulder, a neck extending from the shoulder, and a flange extending from the neck. The flange includes an underside surface extending from the neck, an outer surface extending from the underside surface and defining an outer diameter of the flange, and an inclined sealing surface extending between the outer surface and an inner surface defining an opening in the sealed pharmaceutical container. The inclined sealing surface extends at an angle relative to a plane extending through an end of the opening such that a distance between the inclined sealing surface and the plane increases with decreasing radial distance from the outer surface. The sealed pharmaceutical container also includes a sealing assembly comprising a stopper extending over the sealing surface of the flange and covering the opening. The sealing assembly also includes a cap securing the stopper to the flange. The stopper has a glass transition temperature ($T_g$) that is greater than or equal to −70° C. and less than or equal to −45° C. The sealing assembly maintains a helium leakage rate of the sealed pharmaceutical container of less than or equal to $1.4 \times 10^{-6}$ cm$^3$/s as the sealed pharmaceutical container is cooled to a temperature of less than or equal to −45° C.

A second aspect of the present disclosure includes a sealed pharmaceutical container according to the first aspect, wherein the sealing assembly maintains the helium leakage rate of the sealed pharmaceutical container of less than or equal to $1.4 \times 10{-6}$ cm$^3$/s as the sealed pharmaceutical container is cooled to a temperature of less than or equal to −80° C.

A third aspect of the present disclosure includes a sealed pharmaceutical container according to any of the first through the second aspects, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to −100° C.

A fourth aspect of the present disclosure includes a sealed pharmaceutical container according to any of the first through the third aspects, wherein the angle is greater than 5 degrees.

A fifth aspect of the present disclosure includes a sealed pharmaceutical container according to any of the first through the fourth aspects, wherein the angle is less than or equal to 45 degrees.

A sixth aspect of the present disclosure includes a sealed pharmaceutical container according to any of the first through the fifth aspects, wherein the inclined sealing surface comprises a surface roughness of less than or equal to 0.1 µm.

A seventh aspect of the present disclosure includes a sealed pharmaceutical container according to any of the first through the sixth aspects, wherein the surface roughness of the inclined sealing surface is predetermined based at least in part on an estimated shrinkage of a sealing assembly associated with the glass container when the sealing assembly is cooled to temperatures less than or equal to −80° C.

An eighth aspect of the present disclosure includes a sealed pharmaceutical container according to any of the first through the seventh aspects, wherein a surface flatness of the inclined sealing surface is less than or equal to 5 µm.

A ninth aspect of the present disclosure includes a sealed pharmaceutical container according to any of the first through the eighth aspects, wherein the sealed pharmaceutical container is constructed of a glass composition having a coefficient of thermal expansion that is greater than or equal to $0 \times 10^{-7}$/K and less than or equal to $70 \times 10^{-7}$/K.

A tenth aspect of the present disclosure includes a sealed pharmaceutical container according to any of the first through the tenth aspects, wherein the stopper comprises a radially heterogeneous composition.

An eleventh aspect of the present disclosure includes a sealed pharmaceutical container including a shoulder, a neck extending from the shoulder, a flange extending from the neck, and an inner surface defining an opening extending through the neck and the flange. The flange includes an upper sealing surface extending from the inner surface, a portion of the upper sealing surface comprises a length of at least 4 mm. The sealed pharmaceutical container also includes a sealing assembly including a stopper extending over the sealing surface of the flange and covering the opening. The sealing assembly also includes a metal-containing cap crimped to the flange. The metal-containing cap compresses the stopper against the upper sealing surface. The compression is maintained on the upper sealing surface as the sealed pharmaceutical container is cooled to a temperature of less than or equal to −80° C. such that a helium leakage rate of the sealed pharmaceutical container is less than or equal to $1.4 \times 10^{-6}$ cm$^3$/s at the temperature.

A twelfth aspect of the present disclosure includes a sealed pharmaceutical container according to the eleventh aspect, wherein the upper sealing surface comprises the inclined sealing surface, wherein the angle is less than or equal to 45 degrees.

A thirteenth aspect of the present disclosure includes a sealed pharmaceutical container according to any of the eleventh through the twelfth aspects, wherein the portion of the upper sealing surface comprises a surface flatness of less than or equal to 5 μm, and the portion extends at an angle relative to the inner surface that is greater than or equal to 89.5 degrees and less than or equal to 90.5 degrees.

A fourteenth aspect of the present disclosure includes a sealed pharmaceutical container according to any of the eleventh through the fourteenth aspects, wherein the sealed pharmaceutical container is constructed of a glass composition having a coefficient of thermal expansion that is greater than or equal to $0 \times 10^{-7}$/K and less than or equal to $70 \times 10^{-7}$/K.

A fifteenth aspect of the present disclosure includes a sealed pharmaceutical container according to any of the eleventh through the fourteenth aspects, wherein a difference between a coefficient of thermal expansion ("CTE") of the metal-containing cap and a CTE of the stopper less than or equal to $50 \times 10^{-7}$/K.

A sixteenth aspect of the present disclosure includes a sealed pharmaceutical container according to any of the eleventh through the fifteenth aspects, wherein the CTE of the metal-containing cap is greater than or equal to $250 \times 10^{-7}$/K.

A seventeenth aspect of the present disclosure includes a sealed pharmaceutical container according to any of the eleventh through the sixteenth aspects, wherein a CTE of the stopper is less than or equal to $290 \times 10^{-7}$/K.

An eighteenth aspect of the present disclosure includes a sealed pharmaceutical container according to any of the eleventh through the seventeenth aspects, wherein the stopper is constructed of a polymer composite comprising greater than 0 wt. % and less than or equal to 30 wt. % of a silicon-based filler material.

A nineteenth aspect of the present disclosure includes a sealed pharmaceutical container according to any of the eleventh through the eighteenth aspects, wherein the silicon-based filler material comprises SiO$_2$ glass particles.

A twentieth aspect of the present disclosure includes a sealed pharmaceutical container according to any of the eleventh through the nineteenth aspects, wherein the silicon-based filler comprises a silicate.

A twenty first aspect of the present disclosure includes a sealed pharmaceutical container according to any of the eleventh through the twentieth aspects, wherein a glass transition temperature of the stopper is less than or equal to −75° C.

A twenty second aspect of the present disclosure includes a sealed pharmaceutical container according to any of the eleventh through the twenty first aspects, wherein a glass transition temperature of the stopper is greater than or equal to −70° C. and less than or equal to −45° C.

A twenty third aspect of the present disclosure includes a sealed pharmaceutical container according to any of the eleventh through the twenty second aspects, wherein the stopper comprises a radially heterogeneous composition.

A twenty fourth aspect of the present disclosure includes a sealed pharmaceutical container according to any of the eleventh through the twenty third aspects, wherein the stopper comprises a low $T_g$ segment in contact with the sealing surface.

A twenty fifth aspect of the present disclosure includes a sealed pharmaceutical container according to any of the eleventh through the twenty sixth aspects, wherein the low $T_g$ segment comprises a low $T_g$ elastomer comprising one or more of a polybutadiene, silicone, a fluorosilicone, a nitrite, and an EPDM elastomer.

A twenty sixth aspect of the present disclosure includes a sealed pharmaceutical container according to any of the eleventh through the twenty fifth aspects, wherein the sealed pharmaceutical container maintains the helium leakage rate at is less than or equal to $1.4 \times 10^{-6}$ cm$^3$/s as it is cooled to the temperature at a rate of less than or equal to 5° C. per minute.

A twenty seventh aspect of the present disclosure includes a sealed pharmaceutical container according to any of the eleventh through the twenty sixth aspects, wherein the cap maintains continuous compression of the stopper against the flange as the sealed pharmaceutical container is cooled.

A twenty eighth aspect of the present disclosure includes a sealed pharmaceutical container according to any of the eleventh through the twenty seventh aspects, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to −100° C.

A twenty ninth aspect of the present disclosure includes a sealed pharmaceutical container according to any of the eleventh through the twenty eighth aspects, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to −120° C.

A thirtieth aspect of the present disclosure includes a method of sealing a sealed pharmaceutical container. The method includes a step of providing a sealed pharmaceutical container comprising a shoulder, a neck extending from the shoulder and a flange extending from the neck. The flange includes an underside surface extending from the neck, an outer surface extending from the underside surface, the outer surface defining an outer diameter of the flange, and a sealing surface extending between the outer surface to an inner surface of the sealed pharmaceutical container that defines an opening. The method also includes the steps of inserting a pharmaceutical composition into the sealed pharmaceutical container, providing a sealing assembly comprising a stopper extending over the sealing surface of the flange and covering the opening, crimping a metal-containing cap over the stopper and against flange to thereby compress the stopper against the sealing surface, and cooling the sealed pharmaceutical container to a temperature of less than or equal to −45° C. After the cooling of the sealed pharmaceutical container, the compression is maintained on the sealing surface such that a helium leakage rate of the sealed pharmaceutical container is less than or equal to $1.4 \times 10^{-6}$ cm$^3$/s at the temperature.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
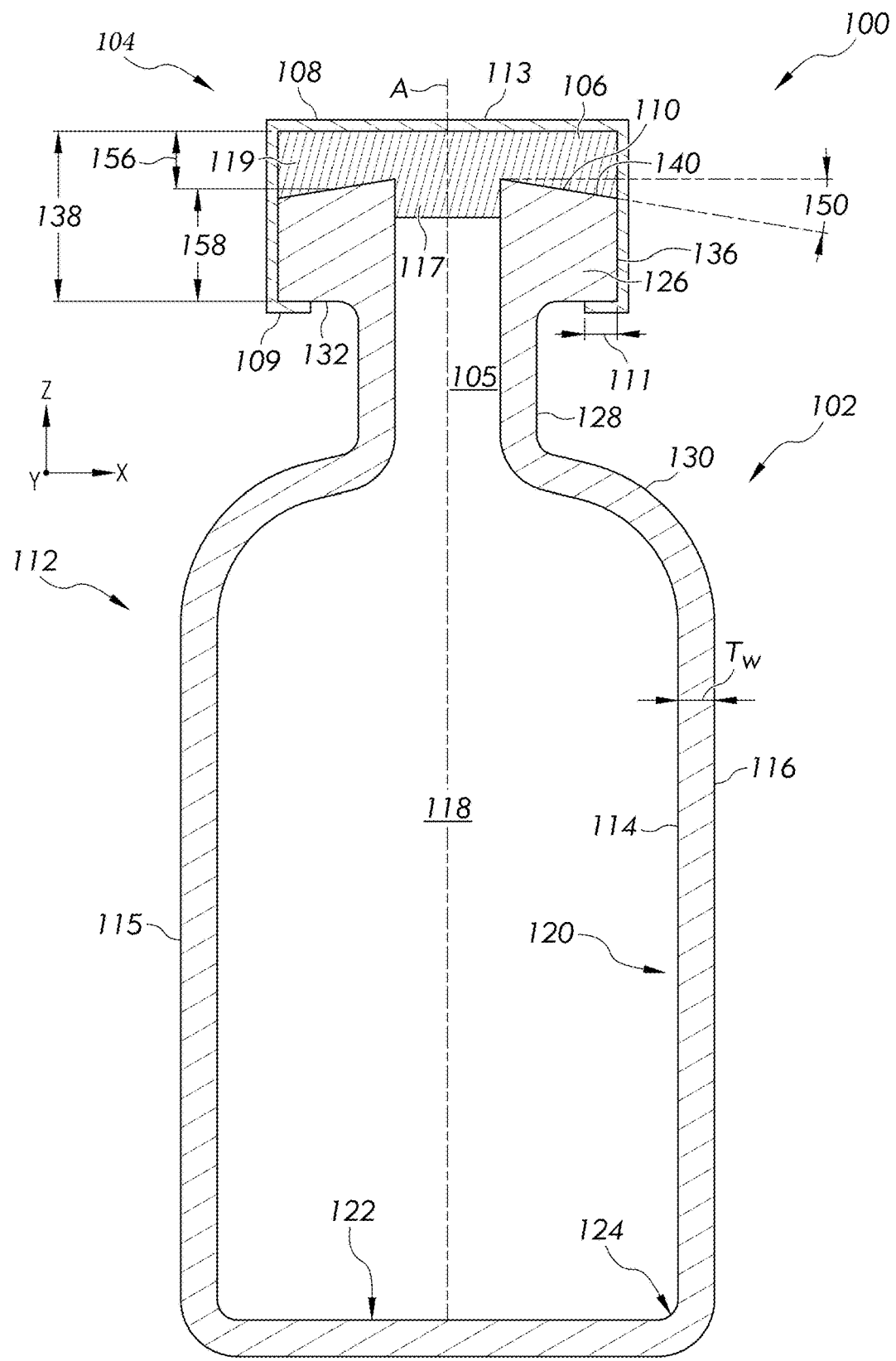
FIG. 1A schematically depicts a cross-sectional view of a sealed glass container, according to one or more embodiments described herein.

Reference will now be made in detail to embodiments of sealed glass containers comprising sealing assemblies that maintain container closure integrity at relatively low storage temperatures (e.g., less than or equal to −40° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., −180° C.). In embodiments, the structure of the glass containers described herein may vary from that of existing pharmaceutical containers in one or more respects to facilitate the maintenance of a seal at the interface between the glass containers and a sealing assembly inserted therein. For example, embodiments of the glass containers described herein may be vials (though other container shapes are within the scope of the present disclosure) comprising a shoulder, a neck, and a flange comprising a sealing surface against which a stopper of a sealing assembly is pressed by a metal-containing cap. Various characteristics of the sealing surface may be adapted to facilitate the maintenance of a seal when the sealed glass containers are cooled to such low storage temperatures. For example, in embodiments, the sealing surface may comprise an inclined sealing surface that descends with increasing radial distance from a central axis of the glass container. The inclined sealing surface may descend at an angle of greater than 5 degrees (e.g., greater than 5 degrees and less than or equal to 45 degrees) relative to a plane extending over an end of the glass container so as to increase an initial force against the stopper applied during a crimping process and increase tolerance for stopper shrinkage when cooled to lower temperatures. In embodiments, the sealing surface extends perpendicular to the central axis of the glass container (e.g., extends at an angle of greater than or equal 90 degrees and less than or equal to 89.5 degrees) to maximize a contact area between the sealing surface and the stopper. In embodiments, various other characteristics of the sealing surface (e.g., surface roughness, flatness, and the like) may be tailored to increase the sealing integrity.

In embodiments, the sealing assembly coupled to the glass containers described herein may be formed of various combinations of materials to facilitate seal maintenance at low storage temperatures. Sealing assemblies of the present specification may comprise a stopper and metal-containing cap formed from compositions tailored to prevent excessive deformation of the stopper relative to the cap at low storage temperatures to maintain sufficient sealing force applied to the stopper via the metal-containing cap. For example, in embodiments, the metal-containing cap may be constructed of a material that increases the CTE thereof over existing, aluminum crimping caps. In embodiments, the metal-containing cap may be constructed of at least one of Zn or Mg instead of Al to provide a higher CTE. In embodiments, the metal-containing cap is constructed of an aluminum-containing polymer composite material. In embodiments, the metal-containing cap is constructed of a metallic alloy comprising at least one of Zn, Al, Mg, Cu. In embodiments, the stopper is constructed of a material having a lower CTE than existing pure rubber stoppers. For example, in embodiments, the stopper may be constructed of a polymer composite comprising greater than 0 wt. % and less than or equal to 30 wt. % of a silicon-based filler material. The silicon-based filler material may comprise $SiO_2$ glass particles or various silicates (e.g., cordierite, b-eucryptite, b-spodumene) or combinations thereof. The CTE of the stopper may be less than or equal to $290 \times 10^{-7}/K$ to reduce shrinkage thereof at low storage temperatures. Various embodiments may include an additional sealing material disposed between the metal-containing cap and the stopper. The sealing material may comprise a relatively low CTE (e.g., less than or equal to $50 \times 10^{-7}/K$) to allow the metal-containing cap to shrink at a greater rate than the sealing material at lower storage temperatures such that the metal-containing cap applies a sealing force to the stopper and sealing material. In embodiments, the sealing material may comprise at least one of Ir, W, Ti, and Si. In embodiments, the sealing material comprises a polymer-based composite.

As used herein, the term "surface roughness" refers to an Ra value or an Sa value. An Ra value is a measure of the arithmetic average value of a filtered roughness profile determined from deviations from a centerline of the filtered roughness. For example, an Ra value may be determined based on the relation:

$$Ra = \frac{1}{n}\sum_{i=1}^{n}|H_i - H_{CL}| \quad (1)$$

where $H_i$ is a surface height measurement of the surface and HCL corresponds to a centerline (e.g., the center between maximum and minimum surface height values) surface height measurement among the data points of the filtered profile. An Sa value may be determined through an areal extrapolation of equation 1 herein. Filter values (e.g., cutoff wavelengths) for determining the Ra or Sa values described herein may be found in ISO ISO 25718 (2012). Surface height may be measured with a variety of tools, such as an optical interferometer, stylus-based profilometer, or laser confocal microscope. To assess the roughness of surfaces described herein (e.g., sealing surfaces or portions thereof), measurement regions should be used that are as large as is practical, to assess variability that may occur over large spatial scales.

As used herein, the term "container closure integrity" refers to maintenance of a seal at an interface between a glass container and a sealing assembly (e.g., between a sealing surface of a glass container and a stopper) that is free of gaps above a threshold size to maintain a probability of contaminant ingress or reduce the possibility of gas permeability below a predetermined threshold based on the material stored in a glass container. For example, in embodiments, a container closure integrity is maintained if a helium leakage rate during a helium leak test described in USP <1207> (2016) is maintained at less than or equal to $1.4 \times 10^{-6}$ cm$^3$/s.

In the embodiments of the glass containers described herein, the concentration of constituent components (e.g., $SiO_2$, $Al_2O_3$, $B_2O_3$ and the like) of the glass composition from which the glass containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "CTE," as used herein, refers to the coefficient of thermal over a temperature range from about $-200°$ C. to about $300°$ C., unless stated otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1A, one embodiment of a sealed glass container 100 for storing a pharmaceutical formulation is schematically depicted in cross section. The sealed glass container 100 comprises a glass container 102 and a sealing assembly 104 coupled to the glass container 102 via an opening 105 of the glass container 102. The sealing assembly 104 comprises a stopper 106 and a metal-containing cap 108. In the embodiment depicted in FIG. 1, the stopper 106 comprises an insertion portion 117 and a sealing portion 119. The insertion portion 117 is inserted into the opening 105 of the glass container 102 until the sealing portion 119 contacts an upper sealing surface 110 of the glass container 102. The sealing portion 119 is then pressed against the upper sealing surface 110 via crimping of the metal-containing cap 108 to form a seal at the upper sealing surface 110. Various aspects of the glass container 102 and the sealing assembly 104 are designed to ensure maintenance of container closure integrity of the glass container 102 at low storage temperatures, as described herein.

The glass container 102 generally comprises a body 112. The body 112 extends between an inner surface 114 and an outer surface 116 of the glass container 102, includes a central axis A, and generally encloses an interior volume 118. In the embodiment of the glass container 102 shown in FIG. 1A, the body 112 generally comprises a wall portion 120 and a floor portion 122. The wall portion 120 transitions into the floor portion 122 through a heel portion 124. In the depicted embodiment, the glass container 102 includes a flange 126, a neck 128 extending from the flange 126, a barrel 115, and a shoulder 130 extending between the neck 128 and the barrel 115. The floor portion 122 is coupled to the barrel 115 via the heel portion 124. In embodiments, the glass container 102 is symmetrical about a central axis A, with each of the barrel 115, neck 128, and flange 126, being substantially cylindrical-shaped. The body 112 has a wall thickness $T_W$ which extends between the inner surface 114 to the outer surface 116, as depicted in FIG. 1A.

In embodiments, the glass container 102 may be formed from Type I, Type II or Type III glass as defined in USP <660>, including borosilicate glass compositions such as Type 1B borosilicate glass compositions under USP <660>. Alternatively, the glass container 102 may be formed from alkali aluminosilicate glass compositions such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 102 may be constructed from a soda lime glass composition. In embodiments, the glass container 102 is constructed of a glass composition having a coefficient of thermal expansion that is greater than or equal to $0 \times 10^{-7}$/K and less than or equal to $100 \times 10^{-7}$/K (e.g., greater than or equal to $30 \times 10^{-7}$/K and less than or equal to $70 \times 10^{-7}$/K).

While the glass container 102 is depicted in FIG. 1A as having a specific form-factor (i.e., a vial), it should be understood that the glass container 102 may have other form factors, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

The wall thickness $T_W$ of the glass container 102 may vary depending on the implementation. In embodiments, the wall thickness $T_W$ of the glass container 102 may be from less than or equal to 6 millimetres (mm), such as less than or equal to 4 mm, less than or equal to 2 mm, less than or equal to 1.5 mm or less than or equal to 1 mm. In some embodiments, the wall thickness $T_W$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_W$ may be greater than or equal to 0.9 mm and less than or equal to 1.8 mm. The wall thickness $T_W$ may vary depending on the axial location within the glass container 102.

As depicted in FIG. 1A, the flange 126 comprises an underside surface 132, an outer surface 136, and the upper sealing surface 110. The outer surface 136 may define an outer diameter of the flange 126. In embodiments, the metal-containing cap 108 of the sealing assembly 104 is crimped around the flange 126 via any suitable crimping method (e.g., a pneumatic crimping apparatus or the like). During the sealing process, the stopper 106 is inserted into the opening 105, and a compression force is applied to the metal-containing cap 108 during crimping. For example, as depicted in FIG. 1A, the metal-containing cap 108 comprises an underlying portion 109 that contacts the underside surface 132 of the flange 126 to force the stopper 106 to remain in a compressed state and form a seal after the crimping process. Compression of the stopper 106 generates a residual sealing force within the flange 126 that maintains compression on the stopper 106 after the metal-containing cap 108 is crimped into place. In embodiments, the length of the underlying portion 109 of the metal-containing cap 108 that directly contacts the underside surface 132 of the flange 126 possesses a length 111 (e.g., in the X-direction depicted in FIG. 1A) that is greater than or equal to 1 mm to facilitate maintenance of residual sealing force within the stopper 106 at storage temperatures of less than or equal to −80° C.

When the sealed glass container 100 is cooled to relatively low storage temperatures of less than or equal to −80° C. (e.g., less than or equal to −80° C., less than or equal to −100° C., less than or equal to −125° C., less than or equal to −150° C., less than or equal to −175° C., −180° C.), each of the constituent components of the sealed glass container 100 may undergo a volumetric shrinkage that is dependent on the thermal properties of that component. As depicted in FIG. 1A, the volume of material disposed between the underlying portion 109 and an upper portion 113 of the metal-containing cap 108 comprises the sealing portion 119 of the stopper 106 and the flange 126 of the glass container 102. If the combination of the stopper 106 and the flange 126 shrinks in an amount that is greater than the amount of shrinkage of the metal-containing cap 108, the compression on the stopper 106 provided by the metal-containing cap 108 may diminish, increasing the probability of the seal at the upper sealing surface 110 being broken.

For example, as depicted in FIG. 1A, the combined height 138 (e.g., in the Z-direction depicted in FIG. 1A) of the flange 126 and stopper 106 is approximately equal to the distance between the upper portion 113 and underlying portion 109 of the metal-containing cap 108. In such a state, the metal-containing cap 108 may compress the stopper 106 against the upper sealing surface 110 to form a seal. If the combined height 138 shrinks to a greater extent than the metal-containing cap 108, however, the compression of the stopper 106 may diminish, reducing the residual seal force. To maintain a compression of the stopper 106, shrinkage ΔL of the metal-containing cap 108, the stopper 106, and the glass container 102 may satisfy the following relation:

$$\Delta L_{cap} = \Delta L_{vial} + \Delta L_{stopper} \qquad (1)$$

where the shrinkage of ΔL of each component may be approximated by $$\Delta L = L_i \times (e^{\int \alpha(T)} - 1), \qquad (2)$$

where $L_i$ is an initial dimension of the component and $\alpha(T)$ is the temperature-dependent CTE of the material out of which each of the metal-containing cap 108, the stopper 106, and the glass container 102 are constructed.

In embodiments, the stopper 106 is constructed of a polymer-based material (e.g., butyl or other synthetic rubbers). Such materials may comprise a glass transition temperature ($T_g$) that is greater than or equal to −70° C. and less than or equal to −45° C. Below the $T_g$, the stopper 106 may behave as a solid (e.g., loss its elasticity), resulting in a diminished sealing force at the upper sealing surface 110. For example, if the stopper 106 is cooled to beneath its $T_g$, the stopper 106 may not fill the entirety of the gap between the upper sealing surface 110 and the upper portion 113 of the metal-containing cap 108, increasing the probability of the seal breaking. That is, the stopper 106 effectively behaves as two different materials as it is cooled below its glass transition temperature: an elastic material above the transition temperature, and a solid glass below the transition temperature. According to equation 2 herein, the shrinkage of the stopper 106 disposed between the flange 126 and the upper portion 113 of the metal-containing cap 108 when cooled from an initial temperature $T_i$ to a final temperature $T_F$ may be approximated as:

$$\Delta L_{stopper} = L_{i,stopper} \times \left( e^{\int_{T_i}^{T_g} \alpha_{rubber}(T)dT + \int_{T_g}^{T_F} \alpha_{glass}(T)dT} - 1 \right), \quad (3)$$

where $\alpha_{glass}$ refers to the CTE of the glass-like material that the rubber of the stopper 106 transforms into below its glass transition temperature $T_g$. In embodiments, to maintain the seal, the metal-containing cap 108 and stopper 106 may be constructed such that the shrinkage of the metal-containing cap 108 is greater than or equal to the combined shrinkage of the glass container 102 and the stopper 106. To facilitate meeting such a relationship, the shrinkage of the metal-containing cap 108 may be increased, the shrinkage of the stopper 106 and flange 126 may be decreased, or any combination thereof. Alternatively or additionally, the structure of the glass container 102 may be designed to increase an initial capping compression imparted on the stopper 106, thereby providing a greater tolerance for shrinkage of the stopper 106.

In embodiments, the metal-containing cap 108 is constructed of aluminium, which may have a CTE of approximately $240 \times 10^{-7}$/K. Typical rubbers out of which the stopper 106 is constructed (e.g., Butyl 325, Butyl 035, etc.) may have CTEs of greater than or equal to $300 \times 10^{-7}$/K. That is, purely in terms of CTE differential, the metal-containing cap 108 has a tendency to shrink less than the stopper 106, resulting in a diminished sealing force at lower storage temperature. In addition to the above-described CTE mismatch, as depicted in FIG. 1A, the stopper 106 may make up a larger volumetric percentage of the sealing assembly 104 than the metal-containing cap 108, further compounding the tendency of the stopper 106 to undergo a larger thermal shrinkage.

Figure 1B:
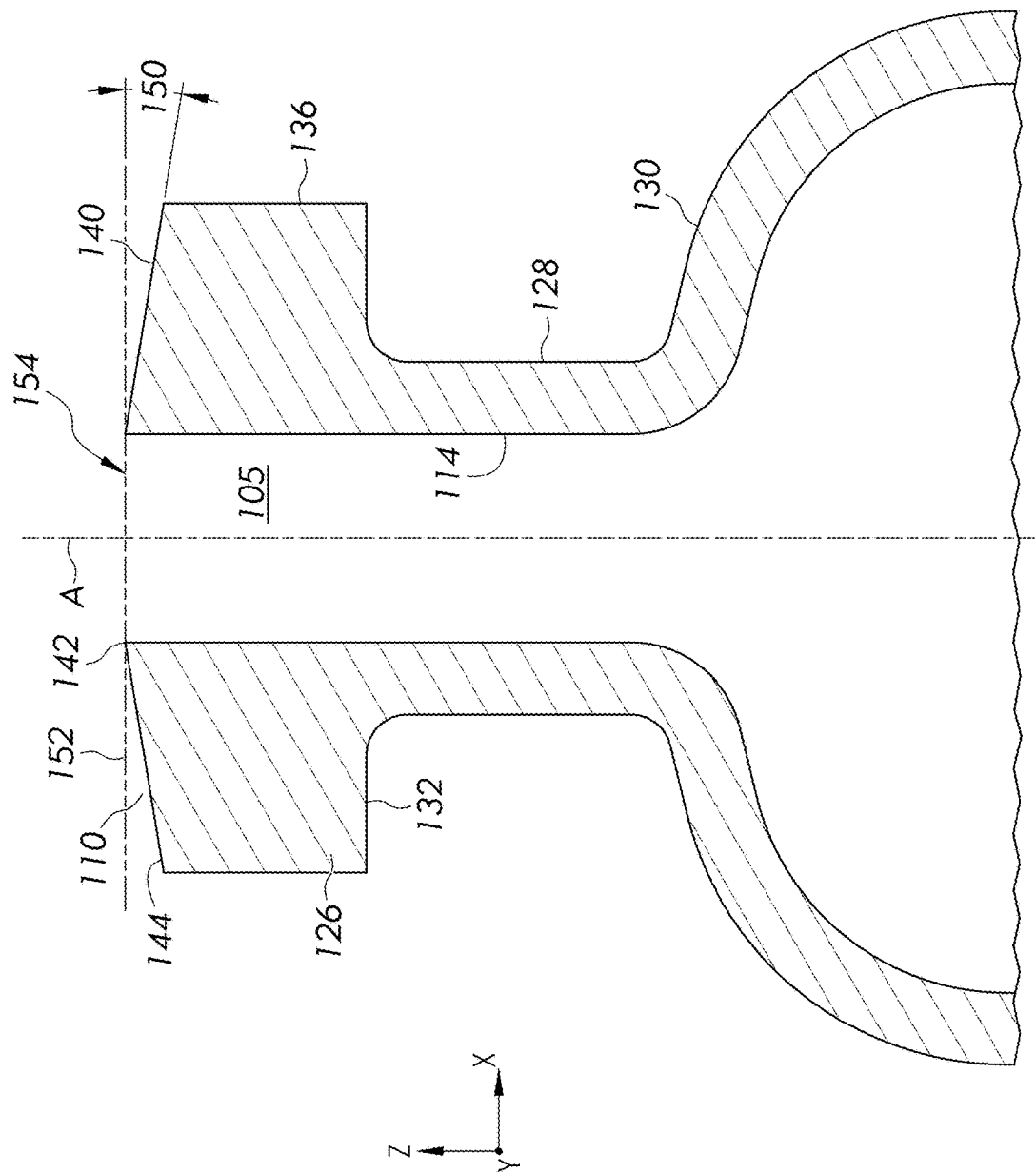
FIG. 1B schematically depicts a cross-sectional view of a glass container, according to one or more embodiments described herein.

In the embodiment depicted in FIG. 1A, to counteract such tendencies of the stopper shrinkage to overwhelm the shrinkage of the metal-containing cap 108 at low storage temperatures, the structure of the glass container 102 has been modified to deviate from existing glass containers to provide greater compression of the stopper 106 during the process of crimping the metal-containing cap 108. FIG. 1B schematically depicts a detailed view of the glass container 102 from the shoulder 130 upwards. As depicted in FIG. 1B, the upper sealing surface 110 comprises an inclined sealing surface 140. The inclined sealing surface 140 extends between the outer surface 136 of the flange 126 and the inner surface 114 of the glass container 102. The inclined sealing surface 140 extends at an angle 150 to a plane 152 extending through an end 154 of the opening 105. The plane 152 may be a planar surface that rests on top of the glass container 102 at the opening 105 (e.g., that rests on peaks of the inclined sealing surface 140). In embodiments, the plane 152 connects points extending around the upper sealing surface 110 that are most distant from a reference point (e.g., the floor portion 122, see FIG. 1A) of the glass container 102. The plane 152 may extend through the top of the glass container 102 in a direction perpendicular to the central axis A of the glass container 102 (e.g., in the X-direction depicted in FIG. 1B). In embodiments, the plane 152 extends perpendicular to the portion of the inner surface 114 defining the opening 105.

The angle 150, as described herein, may be referred to as a "flange angle." Flange angles relative to the plane 152 may be measured in a variety of different ways. For example, in embodiments, to determine an extension direction for the inclined sealing surface 140, an image may be captured of the glass container 102, and image processing techniques may be used to determine the angle 150 of the inclined sealing surface 140 (relative to the plane 152). In embodiments, the extension direction of the inclined sealing surface 140 is measured via finding a plane that extends between a peak of the inclined sealing surface 140 (e.g., having the greatest distance in the Z-direction from the underside surface 132) and a second highest point on the inclined sealing surface 140 (e.g., the extension direction of the inclined sealing surface 140 is measured via a plane that rests on the peak of the inclined sealing surface and another point of the inclined sealing surface 140 that is lower than the peak relative to the plane 152). In embodiments, the extension direction of the inclined sealing surface 140 is measured via connecting points on the inclined sealing surface 140 that are a predetermined distance (e.g., 0.1 mm, 0.2 mm, 0.5 mm, 1.0 mm, etc.) outward from the inner surface 114 and inward of the outer surface 136 (e.g., the points may be taken at a uniform distribution of spatial points extending between the inner surface 114 and the outer surface 136). In embodiments, the extension direction of the inclined sealing surface 140 is measured by curve fitting a linear plane to a plurality of different points distributed throughout the entirety of the inclined sealing surface 140.

In embodiments, the angle 150 is greater than 5 degrees and less than or equal to 45 degrees (e.g., greater than 5 degrees and less than or equal to 40 degrees, greater than 5 degrees and less than or equal to 40 degrees, greater than 5 degrees and less than or equal to 30 degrees, greater than 5 degrees and less than or equal to 20 degrees, greater than 5 degrees and less than or equal to 10 degrees). In embodiments, the angle 150 is substantially uniform around a circumference of the glass container 102 (e.g., when measured at a plurality of azimuthal orientations, each of the measurements may be within 0.5 degrees of one another). In existing glass containers, the angle 150 is typically around 3 degrees. As such, in the glass container 102, the inclination of the upper sealing surface 110 relative to the plane 152 is increased by at least 50% over existing glass containers. The greater inclination of the upper sealing surface 110 tends to increase stopper compression at low storage temperatures. The angle 150 may create a compression gradient within the stopper 106 as a result of crimping the metal-containing cap 108. For example, in embodiments, a compression of the stopper 106 may increase with increasing radial distance from the outer surface 136 such that the compression of the stopper is greater closer to the inner surface 114. Such greater compression with proximity to the inner surface 114 may prevent gaps from forming in the seal as the stopper 106 shrinks with cooling.

Referring to FIG. 1A, as a result of the angle 150, a distance 156 between the upper portion 113 of the metal-containing cap 108 and the upper sealing surface 110 may vary as a function of radial distance from the central axis A to a greater extent than existing glass containers. Given this, the stopper 106 is compressed to a greater extent proximate to the opening 105 than at peripheral regions of the stopper 106 disposed near the outer surface 136 of the flange 126. Such greater compression results in a greater compression of the stopper 106 using the same crimping process, providing a higher tolerance for shrinkage of the stopper 106. Additionally, the inclined sealing surface 140 reduces the term $L_{i,stopper}$ in equation 3 above proximate to the opening 105. This reduces the amount of shrinkage of the metal-containing cap 108 necessary to maintain the relationship of equation 1 herein.

Referring to FIG. 1B, the inclined sealing surface 140 comprises a first edge 142 disposed proximate to the inner surface 114 and a second edge 144 disposed proximate to the outer surface 136 of the flange 126. In the depicted embodiment, the inclined sealing surface 140 extends the entirety of the distance between the outer surface 136 and the inner surface 114 such that the inclined sealing surface 140 corresponds to the upper sealing surface 110 (e.g., the upper sealing surface 110 corresponds to the inclined sealing surface 140). In embodiments, the inclined sealing surface 140 extends only a portion of the distance between the outer surface 136 and the inner surface 114 such that the inclined sealing surface 140 is only a portion of the upper sealing surface 110. In embodiments, the inclined sealing surface 140 comprises a length (e.g. in a direction extending at an angle 150 from the plane 152) that is greater than or equal to 3 mm to facilitate sufficient contact area with the stopper 106 (see FIG. 1A).

In embodiments, various additional characteristics of the upper sealing surface 110 and/or the inclined sealing surface 140 depicted in FIGS. 1A and 1B may be tailored for maintaining a seal at storage temperatures less than or equal to −80° C. For example, in embodiments, the upper sealing surface 110 comprises a surface roughness (e.g., Ra value) that is less than or equal to a threshold value (e.g., 0.1 µm, 50 nm, etc.). Such a low surface roughness beneficially prevents the stopper 106 from pulling away from the upper sealing surface 110 upon cooling. In embodiments, the upper sealing surface is substantially free of defects (e.g., folds, bumps, ridges, etc.). Such defects may lead to gaps forming at the interface between the upper sealing surface 110 and the stopper 106, thereby reducing seal quality. A flatness of the inclined sealing surface 140 may be maintained within a threshold value to facilitate adherence between the stopper 106 and the upper sealing surface 110.

In embodiments, the upper sealing surface 110 comprises a surface roughness (e.g., Sa value) that is greater than or equal to a threshold value (e.g., 3 µm, 5 µm, 10 µm) to increase friction at the upper sealing surface 110 between the glass container 102 and the stopper 106. In such embodiments, the surface roughness of the upper sealing surface 110 may be relatively uniform throughout the entirety thereof. For example, Sa values of the upper sealing surface 110 throughout a plurality of different measurement windows (e.g., 100 µm by 100 µm) may vary by less than or equal 0.1 µm. In embodiments, the roughness of the upper sealing surface 110 may be determined based at least in part on properties (e.g., surface roughness) of the stopper 106. In embodiments, the roughness of the upper sealing surface 110 may approximately equal a difference in shrinkage between the metal-containing cap 108 and the combination of the flange 126 and stopper 106. For example, in embodiments, the surface roughness of the upper sealing surface 110 may be within a threshold value of the estimated shrinkage difference between the metal-containing cap 108 and the combination of the stopper 106 and flange 126. Providing such a surface roughness may ensure at least some contact between the upper sealing surface 110 and the stopper 106 after cooling.

Referring to FIG. 1A, other than the inclined sealing surface 140, additional structural modifications may be made to the sealed glass container 100 apart from the composition of the sealing assembly 104 components (e.g., the metal-containing cap 108 and the stopper 106) to ensure container closure integrity at cold storage temperatures. For example, in embodiments, a flange thickness 158 (e.g. distance between the upper sealing surface 110 and the underside surface 132) may be increased over existing glass containers. In such embodiments, if the stopper 106 and crimping process of the metal-containing cap 108 is unmodified, the proportion of the combined height 138 of material enclosed by the metal-containing cap 108 containing the relatively high CTE stopper 106 is reduced, thereby lowering the shrinkage of the metal-containing cap 108 needed to satisfy equation 1 described herein. Alternatively or additionally, the size of the stopper 106 (e.g., in terms of thickness of the sealing portion 119) may be reduced. In embodiments, the flange height 158 is greater than or equal to 4.0 mm and constitutes at least 61% of the combined height 138.

In addition to the structural aspects of the glass container 102 described herein with respect to FIGS. 1A and 1B that may be designed to maintain a seal at low storage temperatures, compositional adjustments may be made to the sealing assembly 104 to facilitate equation 1 being met at cold storage temperatures. For example, in embodiments, the metal-containing cap 108 is constructed of a higher CTE material than aluminum to facilitate greater shrinkage thereof upon cooling, and therefore greater compression of the stopper 106. In embodiments, the metal-containing cap 108 is constructed such that a difference between a CTE of the metal-containing cap and a CTE of the glass container 102 is greater than or equal to $180 \times 10^{-7}$/K. In embodiments, the CTE of the metal-containing cap 108 is greater than or equal to $250 \times 10^{-7}$/K (greater than or equal to $260 \times 10^{-7}$/K, greater than or equal to $270 \times 10^{-7}$/K, greater than or equal to $280 \times 10^{-7}$/K, greater than or equal to $290 \times 10^{-7}$/K). In embodiments, the metal-containing cap 108 comprises a CTE that is greater than or equal to that of aluminum (at a desired storage temperature of less than or equal to −70° C.), but less than or equal to the CTE of the material out of which the stopper 106 is constructed.

In embodiments, the metal-containing cap 108 comprises Zn or Mg to increase the CTE of the cap relative to aluminum. In embodiments, the metal-containing cap 108 is constructed of a metallic alloy comprising at least one of Zn, Mg, Al, Cu (e.g., a ZAMAK alloy). In embodiments, the metallic alloy comprises less than 5 wt. % Al. In embodiments, the metal-containing cap 108 comprises other metallic alloys, such as a suitable Pb—Sn alloy. In embodiments, any suitable metallic alloy may be used. Metallic alloys may beneficially be used with existing crimping processes. As such, current bottling processes need not be significantly modified to obtain the improved seals described herein.

In embodiments, the metal-containing cap 108 is constructed of a polymer-metal composite material. For example, in embodiments, the metal-containing cap 108 is constructed of an aluminum-polymer composite comprising a polymer matrix coated with an aluminum-containing coating. In embodiments, the metal-containing cap 108 is constructed of an aluminum-polymer composite comprising an aluminum matrix having polymer-based reinforcements disposed therein.

Figure 1C:
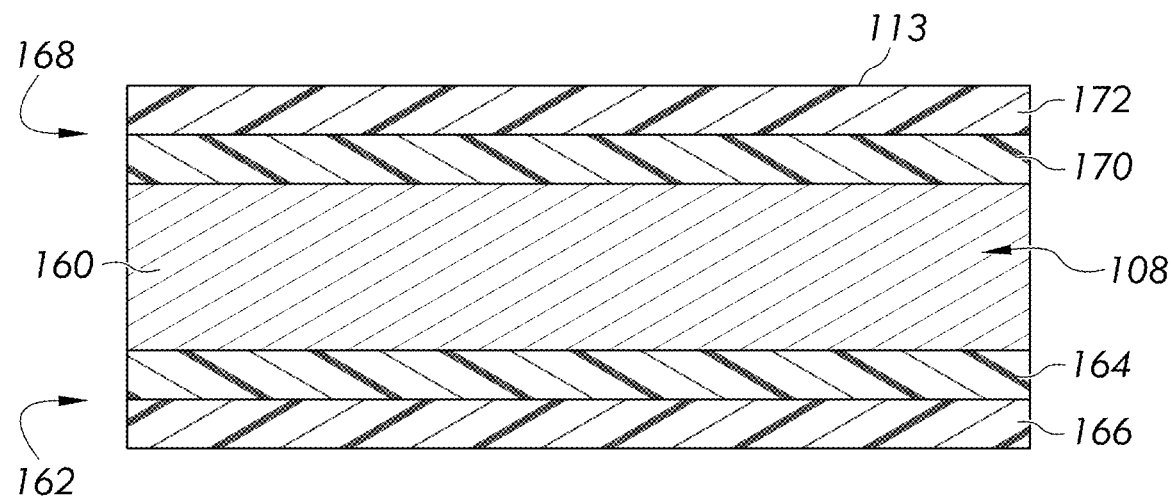
FIG. 1C schematically depicts a cross-sectional view of an upper portion of a metal-containing cap of a sealing assembly of the sealed glass container of FIG. 1A, according to one or more embodiments described herein.

In embodiments, the metal-containing cap 108 comprises a structure that is heterogeneous along the central axis A of the sealed glass container 100. In embodiments, the metal-containing cap 108 comprises a multi-layer laminate structure. The multi-layer laminate structure may comprise a metallic layer and at least one polymer layer. For example, FIG. 1C schematically depicts a cross-sectional view of the upper portion 113 of an embodiment of the metal-containing cap 108. The metal-containing cap 108 comprises an aluminum layer 160, a first multi-layer structure 162 and a second multi-layer structure 168. In embodiments, the metal-containing cap 108 comprises an aluminum content that is greater than or equal to 40 vol. % and less than or equal to 90 vol. %. In embodiments, an entirety of the aluminum content of the metal-containing cap 108 is contained within the aluminum layer 160, and first and second multi-layer structures 162 and 164 are substantially free of aluminum. In embodiments, the aluminum layer 160 comprises a thickness that is less than or equal to caps that are currently in use for sealing glass containers. In embodiments, the thickness of the aluminum layer is greater than or equal to 1 μm and less than or equal to 100 μm. In embodiments, the aluminum layer 160 is a solid aluminum layer. In embodiments, the aluminum layer is a perforated aluminum layer comprising a plurality of perforations extending between the first and second multi-layer structures 162 and 168. The perforations may beneficially reduce the overall percentage by volume of aluminum within the metal-containing cap 108, thereby increasing the proportion of the metal-containing cap 108 made up of the first and second multi-layer structures 162 and 168. Such greater proportion of polymeric material may increase the overall CTE of the metal-containing cap 108, thereby facilitating greater shrinkage thereof upon cooling and seal maintenance.

In embodiments, the first and second multi-layer structures 162 and 168 comprise elastomeric layers 164 and 170 and glassy polymer layers 166 and 172, respectively. In embodiments, the glassy polymer layers 166 and 172 are constructed of a polymeric material having a glass transition temperature of greater than or equal to 25° C. The glassy polymer layers 166 and 172 may facilitate the metal-containing cap 108 retaining rigidity to a great enough extent in order to be used in current crimping processes, while reducing the effects of the material of the elastomeric layers 164 and 170 reaching their $T_g$ upon cooling to low storage temperatures.

In embodiments, the elastomeric layers 164 and 170 are constructed of Butyl rubber. In embodiments, the elastomeric layers 164 and 170 are constructed of one or more low $T_g$ elastomeric materials such as Polybutadienes, silicones, fluorosilicones, nitrites, and EPDM elastomers (e.g., PDMS), or any combination thereof. In embodiments, the elastomeric layers 164 and 170 comprise a glass transition temperature that is less than or equal to -100° C. In embodiments, the elastomeric layers 164 and 170 comprises additions, such as a silica nanoparticles (e.g., comprising a particle size that is greater than or equal to 10 nm and less than or equal to 100 nm). In embodiments, the additions comprise less than or equal to 30 wt. % of the elastomeric layers 164 and 170. The glassy polymer layers 166 and 172 may also comprise such additions. The additions may tune the mechanical properties of the first and second multi-layer structures 162 and 168 to provide a CTE mismatch between the metal-containing cap 108 and the stopper 106 that maximizes compression of the stopper 106 upon cooling to lower storage temperatures.

Referring still to FIG. 1C, in embodiments, the metal-containing cap 108 comprises a plurality (e.g., greater than or equal to 5, 10, 20, 50, 100) of the depicted multi-layer structure (e.g., comprising the aluminum layer 160 and the first and second multi-layer structures 162 and 178) stacked on top of one another. In embodiments, the metal-containing cap 108 comprises an overall thickness (e.g., a combined thickness of the stacked multi-layer structures) that is greater than or equal to 200 μm and less than or equal to 300 μm. In embodiments, the thickness of the metal-containing cap 108 is increased over metallic caps that are currently used to seal pharmaceutical containers to increase the shrinkage propensity thereof when cooled to temperatures less than or equal to -70° C.

In addition to the compositional modifications to the metal-containing cap 108 described herein, the composition of the stopper 106 may be chosen to lower the CTE or glass transition temperature thereof. Choosing such compositions for the stopper 106 may lower the shrinkage thereof and therefore help maintain compression of the stopper 106 via the metal-containing cap 108. For example, in embodiments, the polymer formulation of the stopper 106 may be chosen (or additions may be added to the stopper 106) such that the glass transition temperature of the stopper 106 is less than or equal to -75° C. (e.g., less than or equal to -80° C., less than or equal to -85° C.). In embodiments, the glass transition temperature of the stopper 106 may be lowered to below a desired storage temperature of the sealed glass container 100 (e.g., to less than or equal to dry ice storage temperatures around -80° C.) such that the stopper 106 retains elasticity, creating the seal at the upper sealing surface 110. In embodiments, the stopper 106 is constructed of one or more low $T_g$ elastomeric materials such as Polybutadienes, silicones, fluorosilicones, nitrites, and EPDM elastomers (e.g., PDMS), or any combination thereof. In embodiments the elastomeric material comprises a glass transition temperature that is less than or equal to -100° C.

In embodiments, the stopper 106 comprises a polymer-based composite material having a lower CTE than typically used rubbers. In embodiments, the stopper 106 is constructed from a rubber-filler mixture. For example, in embodiments, the stopper 106 comprises up to 15% by volume of filler material. In embodiments, the stopper 106 comprises less than or equal to 40 wt. % filler material (e.g., less than or equal to 30 wt. % filler material). More than 40 wt. % filler material may diminish seal quality by lowering the elasticity of the stopper 106. The filler material may have a CTE that is less than that of the rubber out of which stoppers are typically constructed (e.g., less than or equal to $50 \times 10^{-7}$/K, less than or equal to $20 \times 10^{-7}$/K, less than or equal to $10 \times 10^{-7}$/K, less than or equal to $5 \times 10^{-7}$/K). In embodiments, the filler comprises silicon. For example, in embodiments, the filler material comprises $SiO_2$ glass particles. In embodiments, the $SiO_2$ glass particles may have a particle size that is greater than or equal to 10 nm and less than or equal to 100 nm. In embodiments, the $SiO_2$ glass particles may be functionalized with organosilanes to tune the particle dispersion state within the elastomeric material of the stopper 106. In embodiments, the filler material comprises a silicate (e.g., cordierite, b-eucryptite, b-spodumene). In embodiments, the filler material is a high melting point metal (e.g., Ir, W, Ti, Si). In embodiments, the filler material comprises $Mg_2PO_4$. In embodiments, the filler material comprises an oxide, such as $SiO_2$, Ti-doped $SiO_2$, $ZrW_2O_8$, or other ceramics in the $AM_2O_8$ family. In embodiments, the filler material comprises any other suitable material with a relatively low or negative CTE. In embodiments, the CTE of the stopper 106 containing the filler material is less than or equal to $300 \times 10^{-7}$/K (e.g., less than or equal to $290 \times 10-7$/K, less than or equal to $280 \times 10^{-7}$/K, less than or equal to $270 \times 10^{-7}$/K). By adding the filler material described herein to the stopper 106, the CTE differential between the metal-containing cap 108 and stopper 106 is reduced, thereby reducing the likelihood of decompression of the stopper 106 when the sealed glass container 100 is cooled to storage temperatures that are less than or equal to -80° C.

Figure 1D:
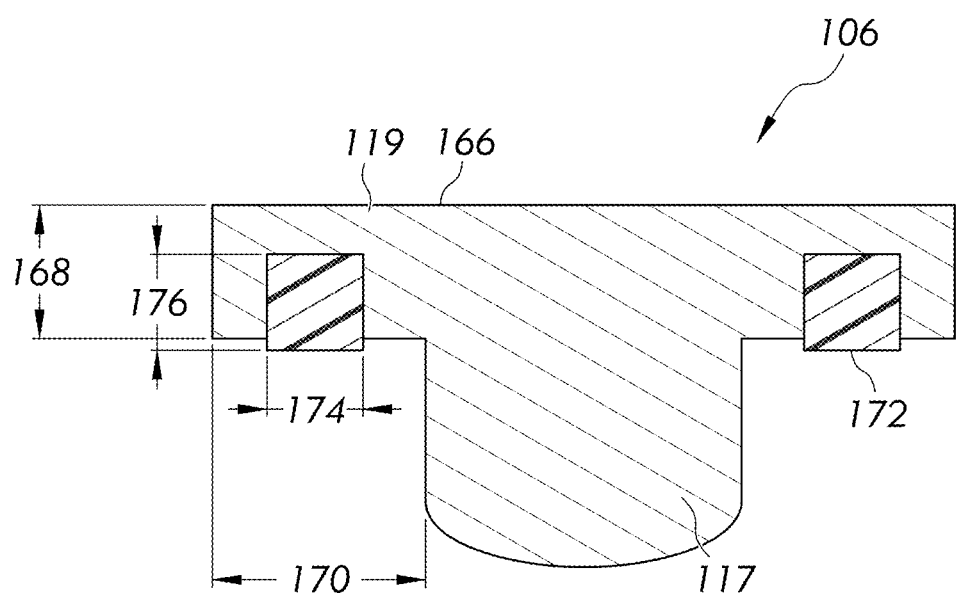
FIG. 1D schematically depicts a cross-sectional view of an upper portion of stopper of the sealing assembly of the sealed glass container of FIG. 1A, according to one or more embodiments described herein.

In embodiments, the stopper 106 comprises a radially heterogeneous structure having a variable composition. For example, FIG. 1D schematically depicts an example embodiment of the stopper 106 in cross-section. As depicted, the stopper 160 comprises a body 166 defining the insertion portion 117 and the sealing portion 119. In embodiments, the body 166 is constructed of an elastomeric material having a relatively high elasticity at room temperature, such as Butyl rubbers or any other suitable stopper material. The body 166 may be similar in size and dimension to stoppers that are currently in use for sealing pharmaceutical glass containers. For example, in the depicted embodiment, the sealing portion 119 comprises a thickness 168 and a width 170. In embodiments, the width 170 is greater than or equal to a radial distance between the inner surface 114 and the outer surface 136 of the glass container 102 (See FIG. 1B) to maximize a contact area between the sealing portion 119 and the upper sealing surface 110 of the glass container 102.

In the embodiment depicted in FIG. 1D, the stopper 106 further comprises low $T_g$ segment 172 in the sealing portion 119. The low $T_g$ segment 172 may be disposed in the sealing portion 119 such that the low $T_g$ segment 172 contacts the upper sealing surface 110 of the glass container 102 upon insertion of the stopper 106 therein. In embodiments, the stopper 106 may be constructed by compression molding or injection molding. In embodiments, the body 166 and the low $T_g$ segment 172 may be separately formed and bonded together. For example, as depicted in FIG. 1D, the low $T_g$ segment 172 slightly protrudes from the sealing portion 119. Such protrusion depicts the low $T_g$ segment 172 being separately constructed from the body 166 (e.g. via injection or compression molding) and later bonded thereto. In embodiments, once the stopper 106 is constructed and inserted into the glass container 102, the low $T_g$ segment 172 is compressed into the body 166 (e.g., via the metal-containing cap 108) such that both the body 166 and the low $T_g$ segment 172 press against the upper sealing surface 110.

In embodiments, the low $T_g$ segment 172 comprises a radial width 174 that is greater than or equal to 10% and less than or equal to 50% of the width 170 of the sealing portion 119 of the body 166. The low $T_g$ segment 172 also comprises a thickness 176 that is greater than or equal to 10% and less than or equal to 90% of the sealing portion 119 of the body 166. The low $T_g$ segment 170 may comprise greater than or equal to 1% and less than or equal to 45% by volume of the sealing portion 119 depending on the storage application. In embodiments, the volumetric proportion of the low $T_g$ segment 172 relative to the body 166 may depend on the dimensions of the glass container 102 (e.g., the flange thickness 152) and the compositions of the stopper 106 and metal-containing cap 108.

In embodiments, the low $T_g$ segment 172 is constructed of a low $T_g$ elastomeric material. In embodiments, the glass transition temperature of the low $T_g$ elastomeric material is less than or equal to –75° C. (e.g., less than or equal to –80° C., less than or equal to –90° C., less than or equal to –100° C., less than or equal to –110° C., less than or equal to –120° C.). In embodiments, the low $T_g$ segment 172 comprises one or more low $T_g$ elastomeric materials such as Polybutadienes, silicones, fluorosilicones, nitrites, and EPDM elastomers (e.g., PDMS), or any combination thereof. The relatively low glass transition temperature of the low $T_g$ segment 172 as compared to the body 166 beneficially maintains elasticity of the stopper 106 at a point of contact between the sealing portion 119 and the upper sealing surface 110 of the glass container 102 when cooled to relatively low temperatures of less than or equal to –70° C.

The low $T_g$ elastomeric material of the low $T_g$ segment 172 may have a higher gas permeability than the material of the body 166. In embodiments, to improve the gas permeability of the low $T_g$ segment 172, the low $T_g$ segment comprises up to 30 wt. % filler material. In embodiments, the filler material comprises silicon. For example, in embodiments, the filler material comprises $SiO_2$ glass particles. In embodiments, the $SiO_2$ glass particles may have a particle size that is greater than or equal to 10 nm and less than or equal to 100 nm. In embodiments, the $SiO_2$ glass particles may be functionalized with oranosilanes to tune the particle dispersion state within the elastomeric material of the stopper 106. In embodiments, the filler material comprises a silicate (e.g., cordierite, b-eucryptite, b-spodumene). The filler material of the low $T_g$ segment 172 lowers the CTE thereof relative to the body 166 to facilitate maintenance of contact and compression at the upper sealing surface 110 of the glass container 110, It should be appreciated that any combination of the above-described approaches (e.g., lowering the CTE and/or $T_g$ of the stopper 106, increasing the CTE of the metal-containing cap 108, structurally modifying the glass container 102 in any of the ways described herein) may be used in the sealed glass container 100. For example, in embodiments, the inclined sealing surface 140 may significantly increase compression of the stopper 106 such that conventional materials for the stopper 106 (e.g., Butyl rubbers) and metal-containing cap 108 (e.g., aluminum) may be used while still maintaining a seal at temperatures less than or equal to –80° C. A similar result may be achieved if the upper sealing surface 110 meets certain requirements (e.g., flatness, surface roughness uniformity, etc.). In embodiments, the inclined sealing surface 140 may be combined with one or more material modifications to the sealing assembly 104 (e.g., reduced-CTE stopper 106, increased-CTE metal-containing cap 108) to provide an even more robust seal for storage temperatures less than or equal to –100° C. (e.g., less than or equal to –125° C., less than or equal to –150° C., less than or equal to –170° C.). The specific combination of structural or compositional modifications used may depend on the storage application.

In embodiments, both a high CTE metal-containing cap 108 (e.g., constructed of a polymer-aluminum composite) and low CTE stopper 106 (e.g., constructed of a rubber-$SiO_2$ composite) may be used. In such embodiments, given that the shrinkage differential between the metal-containing cap 108 and the stopper 106 is reduced by composition formulation, modification of the structure of the glass container 102 may be avoided. Such approaches may be beneficial for use with existing glass containers, where the angle 150 of the inclined sealing surface 140 may be approximately 3 degrees. The ultimate structure of the glass container 102 and sealing assembly 104 may vary depending on the implementation.

Figure 2A:
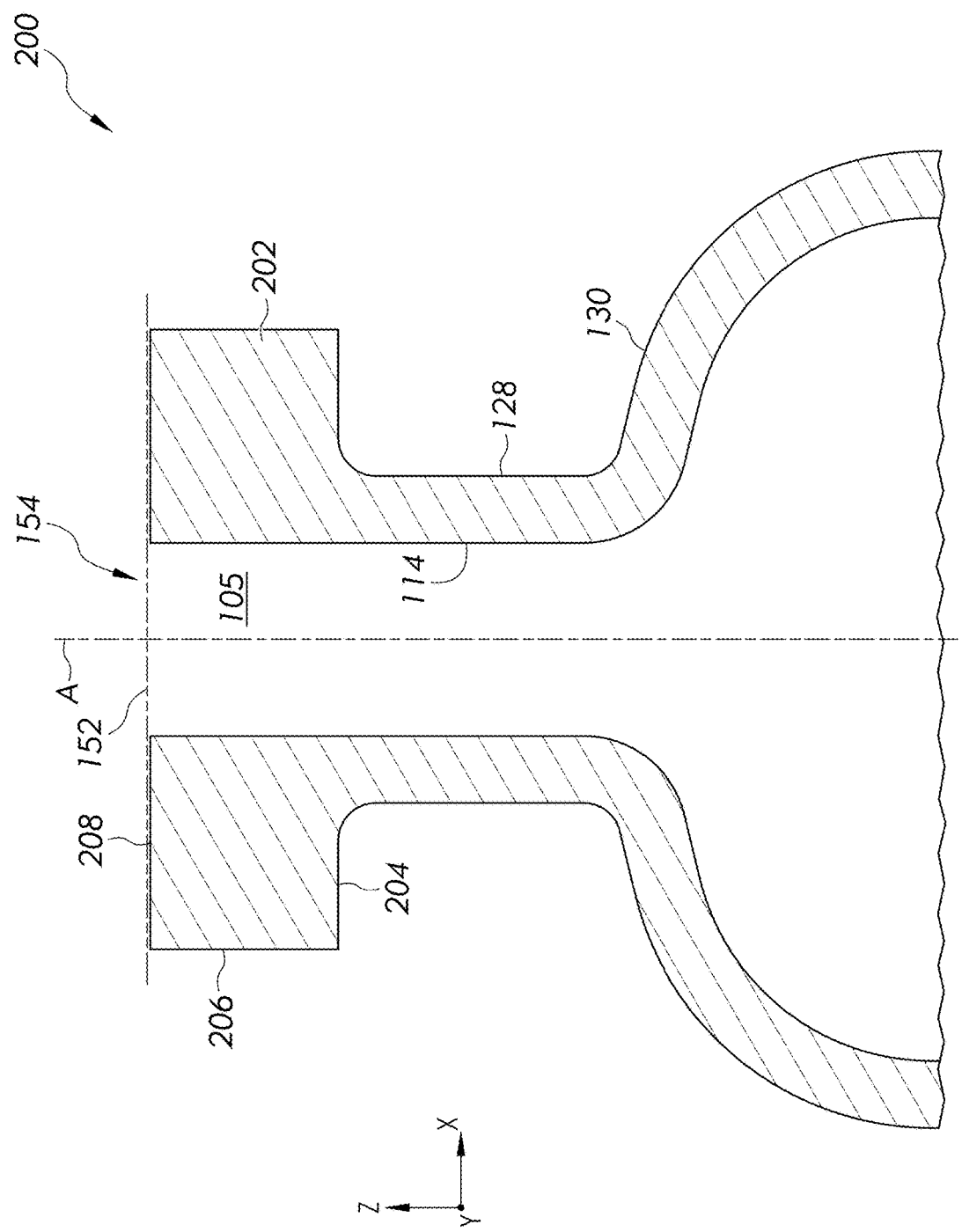
FIG. 2A schematically depicts a cross-sectional view of a glass container, according to one or more embodiments described herein.

It should be understood that alternatives to the glass container 102 described herein with respect to FIGS. 1A and 1B may be used while still maintaining container closure integrity at storage temperatures less than or equal to –80° C. For example, FIG. 2A schematically depicts a sectional view of another glass container 200. The glass container 200 may comprise similar components to the glass container 102 described herein with respect to FIGS. 1A and 1B. Accordingly, FIG. 2A incorporates like reference numerals to indicate the incorporation of such like components.

The glass container 200 differs from the glass container 102 described with respect to FIGS. 1A and 1B in that the glass container 200 includes flange 202 comprising an underside surface 204, an outer surface 206, and an upper sealing surface 208. As depicted in FIG. 2A, the upper sealing surface 208 extends in the plane 152 extending through the end 154 of the opening 105 in the glass container 200. In embodiments, the upper sealing surface 208 extends substantially perpendicular (e.g., at an angle greater than or equal to 89.5 degrees and less than or equal to 90.5 degrees) to the central axis A of the glass container 200. In embodiments, the upper sealing surface 208 extends substantially perpendicular to the inner surface 114 of the glass container 200 defining the opening 105. Such an upper sealing surface 208 beneficially increases a contact area between the stopper 106 (see FIG. 1A) and the upper sealing surface 208 and may increase the probability of maintaining integrity of the seal.

In embodiments, the upper sealing surface 208 may be constructed to possess the surface characteristics described herein with respect to the inclined sealing surface 140 described with respect to FIGS. 1A and 1B to increase the quality of contact with the stopper 106. For example, in embodiments, the upper sealing surface 208 comprises a surface roughness that is less than or equal to a threshold value (e.g., 0.1 µm) to reduce the probability of gaps being formed at the interface between the upper sealing surface 208 and the stopper 106. In embodiments, the upper sealing surface 208 comprises a uniform surface roughness (e.g., greater than or equal to 3 µm, greater than or equal to 5 µm) based on an estimated shrinkage of the flange 202 and stopper 106 when cooled to any of the cold storage temperatures described herein. In embodiments, the upper sealing surface comprises a surface flatness that is less than or equal to a threshold value.

Figure 2B:
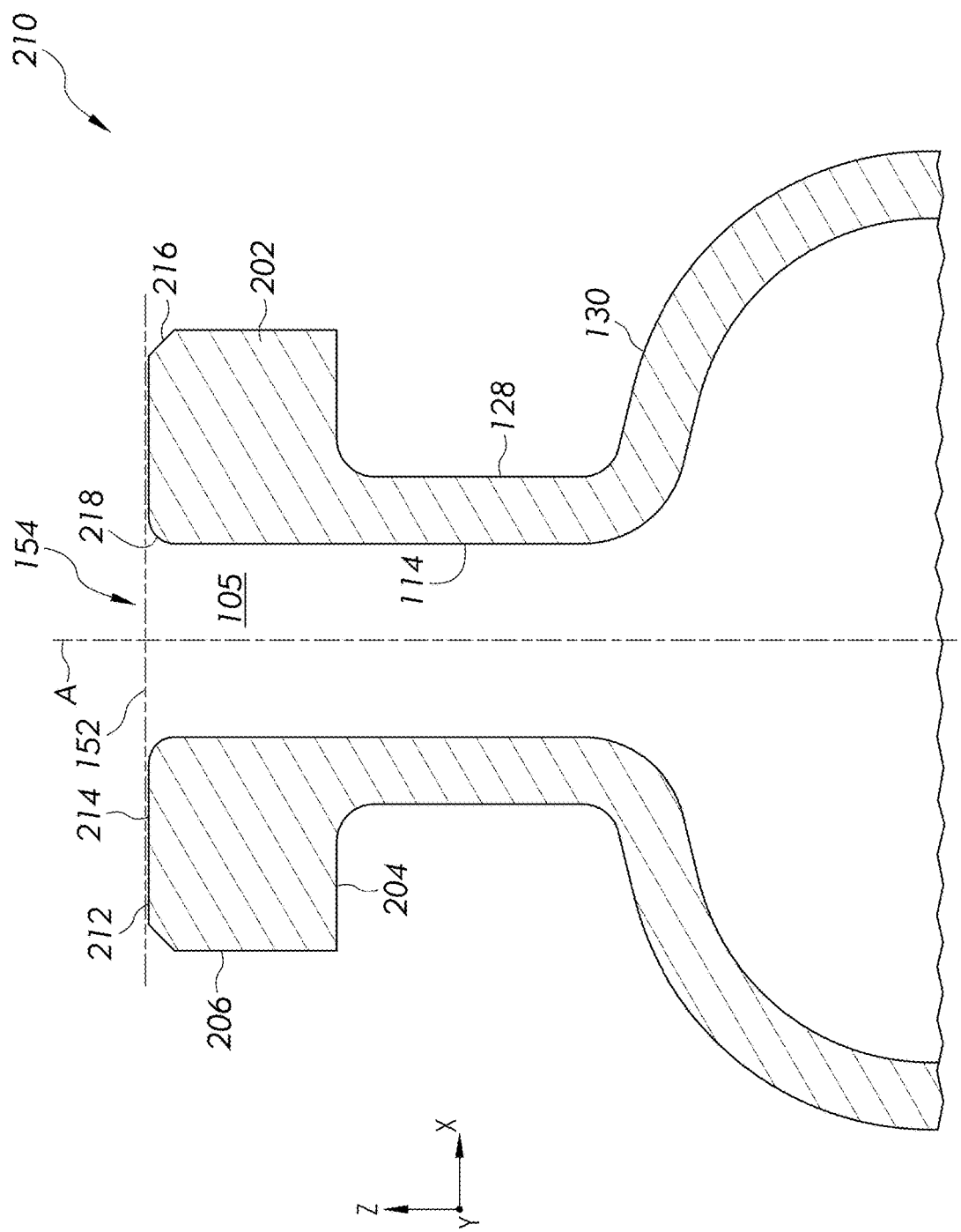
FIG. 2B schematically depicts a cross-sectional view of a glass container, according to one or more embodiments described herein.

In the example depicted in FIG. 2A, the upper sealing surface 208 extends from the outer surface 206 to the inner surface 114. It should be appreciated that the upper sealing surface 208 may include a variety of different features consistent with the present disclosure. For example, FIG. 2B schematically depicts a sectional view of a glass container 210 comprising an upper sealing surface 212 comprising a flat portion 214, a chamfer 216 extending between the flat portion 214 and the outer surface 206 of the flange 202, and a rounded corner 218 extending between the flat portion 214 and the inner surface 114. The flat portion 214 may extend in the plane 152 like the entirety of the upper sealing surface 208 depicted in FIG. 2A. In embodiments, the chamfer 216 extends at an angle of 45 degrees relative to the flat portion 214. In embodiments, the chamfer 216 increases the integrity of the seal created by the stopper 106 by allowing the stopper to encapsulate the upper sealing surface 212 in multiple directions. In embodiments, rather than the rounded corner 218, the upper sealing surface 212 comprises a chamfer similar in structure to the chamfer 216 extending between the flat portion 214 and the inner surface 114. It should be appreciated that any of the features (e.g., the chamfer 216, the rounded corner 218, or other sealing feature) described herein with respect to FIG. 2B may also be incorporated into the inclined sealing surface 140 described herein with respect to FIG. 1B (e.g., the upper sealing surface 110 may comprise a chamfer extending between the inclined sealing surface 140 and the outer surface 136).

Figure 3:
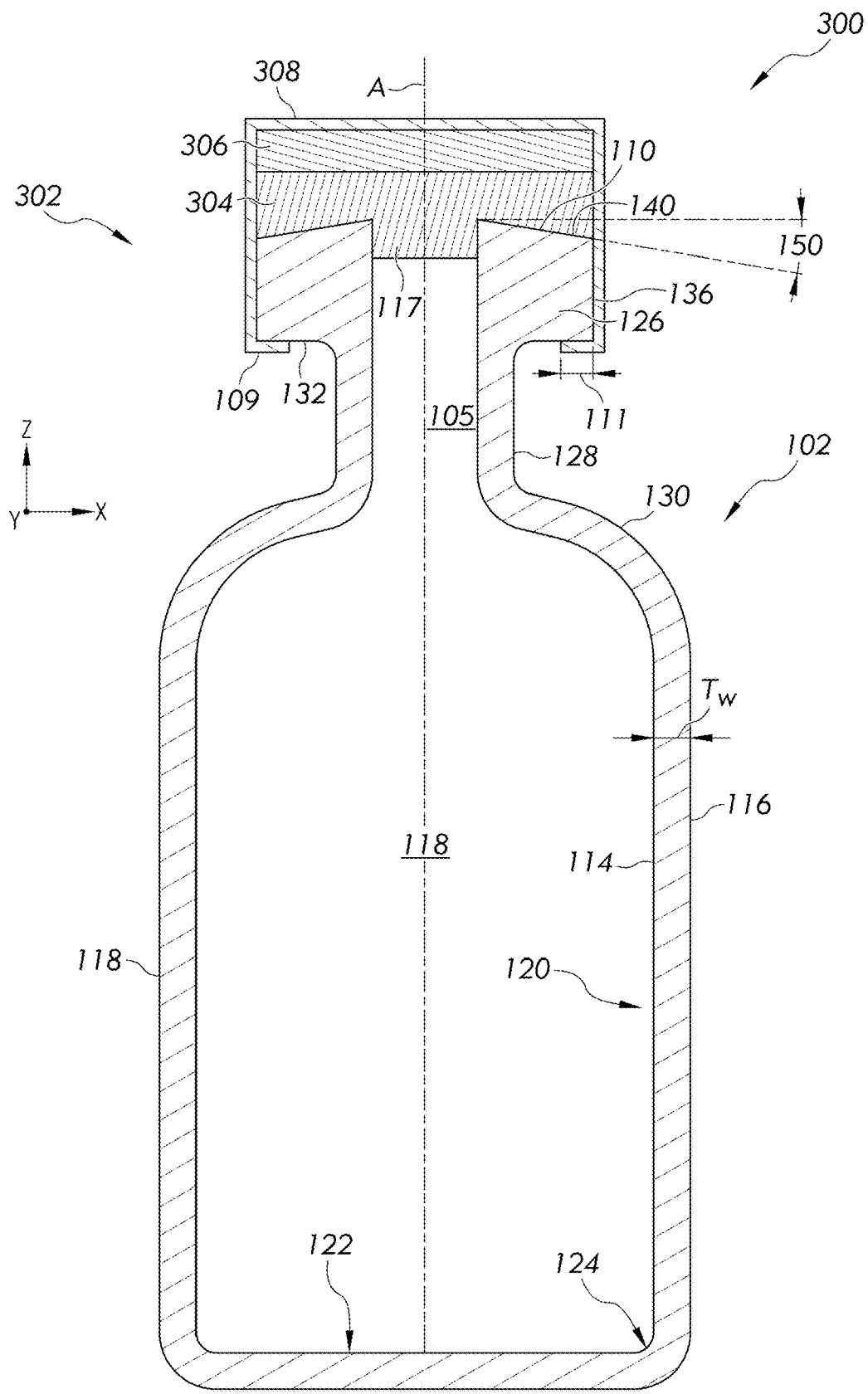
FIG. 3 schematically depicts a cross-sectional view of a sealed glass container, according to one or more embodiments described herein.

Referring now to FIG. 3, a cross-sectional view of a sealed glass container 300 is depicted. The sealed glass container 300 comprises the glass container 102 described herein with respect to FIGS. 1A and 1B. Accordingly, like reference numerals are used in FIG. 3 to signify the incorporation of such like components. The sealed glass container 300 comprises a sealing assembly 302 inserted into the glass container 102 to seal the opening 105 therein. The sealing assembly 302 comprises a stopper 304 that is inserted into the opening 105 and compressed against the upper sealing surface 110 via a crimped metal-containing cap 308. In embodiments, the stopper 304 and metal-containing cap 308 are similar in structure and function to the stopper 106 and metal-containing cap 108 described herein with respect to FIGS. 1A and 1B, and be constructed of any of the materials described herein to increase the sealing integrity at low sealing temperatures.

The sealing assembly 302 depicted in FIG. 3 differs from the sealing assembly 104 described herein with respect to FIGS. 1A and 1B in that the sealing assembly 302 comprises a sealing material 306 disposed between the metal-containing cap 308 and the stopper 304. The sealing material 306 may be affixed to the metal-containing cap 308 and/or the stopper 304, depending on the implementation. In embodiments, the sealing material 306 is constructed of a material having a CTE that is less than that of both the metal-containing cap 308 and the stopper 304. Incorporating of the sealing material 306 may reduce the overall CTE (e.g., average CTE) of the material stack disposed within the metal-containing cap 308 (e.g., the flange 126, the stopper 304, and the sealing material 306) as compared to embodiments not incorporating the sealing material 306. Such overall CTE reduction reduces the overall amount of shrinkage of the material disposed within the metal-containing cap 308, thereby facilitating the maintenance of compression on the stopper 304.

In embodiments, the sealing material 306 comprises a CTE of less than or equal to $50 \times 10^{-7}$/K (e.g., less than or equal to $25 \times 10^{-7}$/K, less than or equal to $10 \times 10^{-7}$/K, less than or equal to $5 \times 10^{-7}$/K). In embodiments, the sealing material is constructed of a high melting point metal (e.g., Ir, W, Ti, Si). In embodiments, the sealing material 306 is constructed of a polymer or rubber-based composite (e.g., such as those described herein with respect to the stopper 106). In embodiments, the sealing material 306 comprises an oxide, such as $SiO_2$, Ti-doped $SiO_2$, $ZrW_2O_8$, or other ceramics in the $AM_2O_8$ family. The sealing material 306 may have any suitable size or shape, depending on the implementation. In embodiments, the sealing material 306 is symmetric about the central axis A of the glass container 102 to facilitate maintenance of a uniform compression on the stopper 304.

Figure 4A:
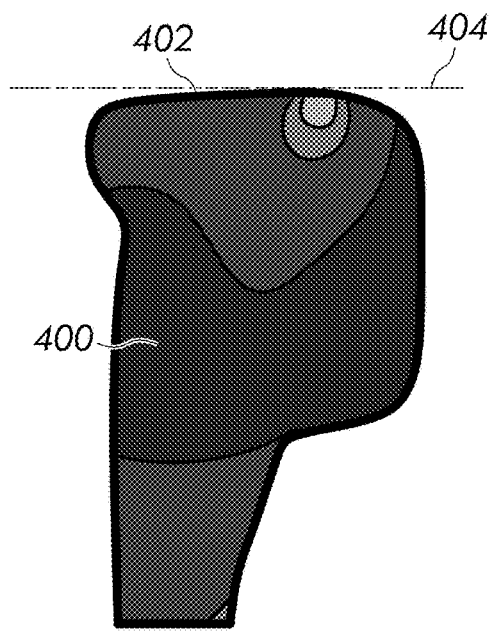
FIG. 4A depicts a simulation of compression of a stopper against a flange of a glass container at multiple storage temperatures, where the flange comprises a first flange angle, according to one or more embodiments described herein.
Figure 4A:
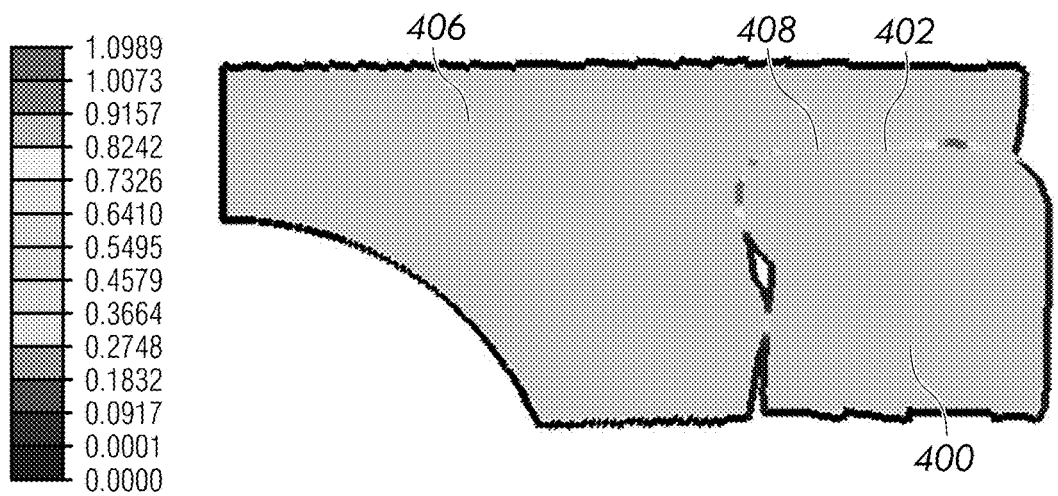
Figure 4A:
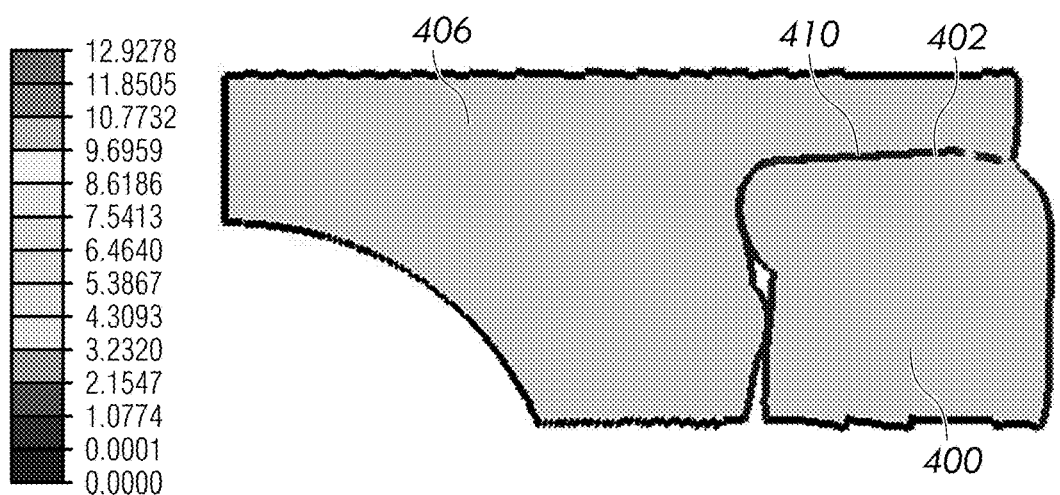
Figure 4B:
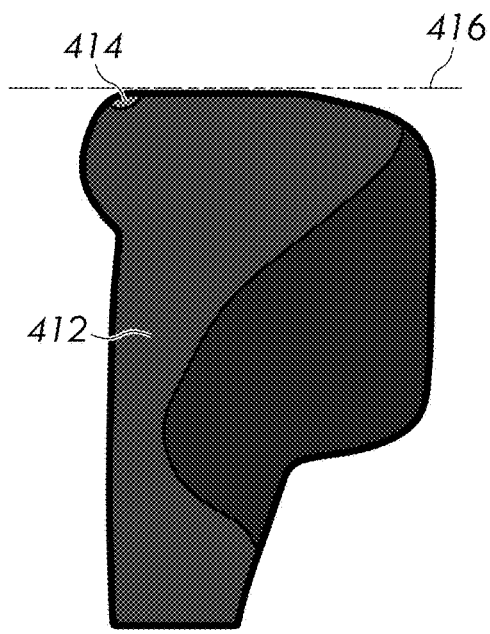
FIG. 4B depicts a simulation of compression of a stopper against a flange of a glass container at multiple storage temperatures, where the flange comprises a second flange angle, according to one or more embodiments described herein.
Figure 4B:
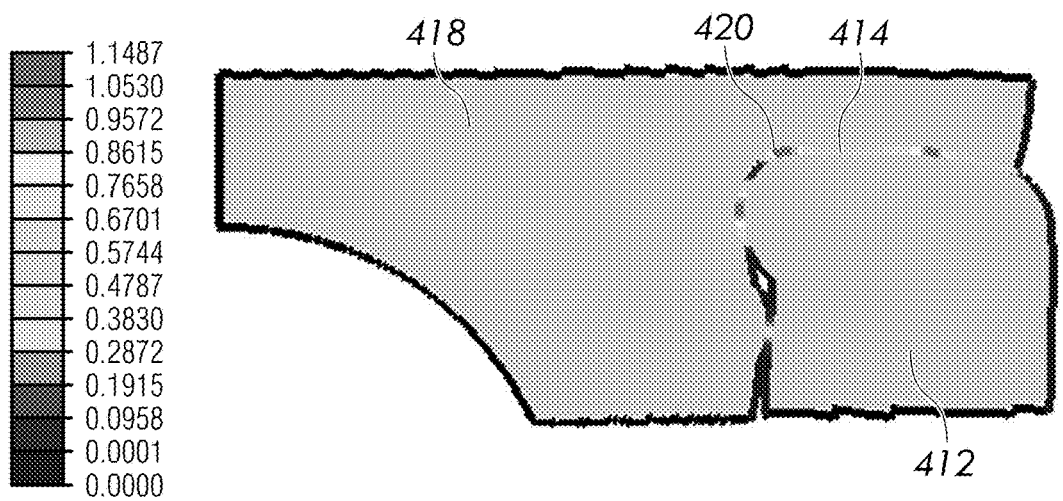
Figure 4B:
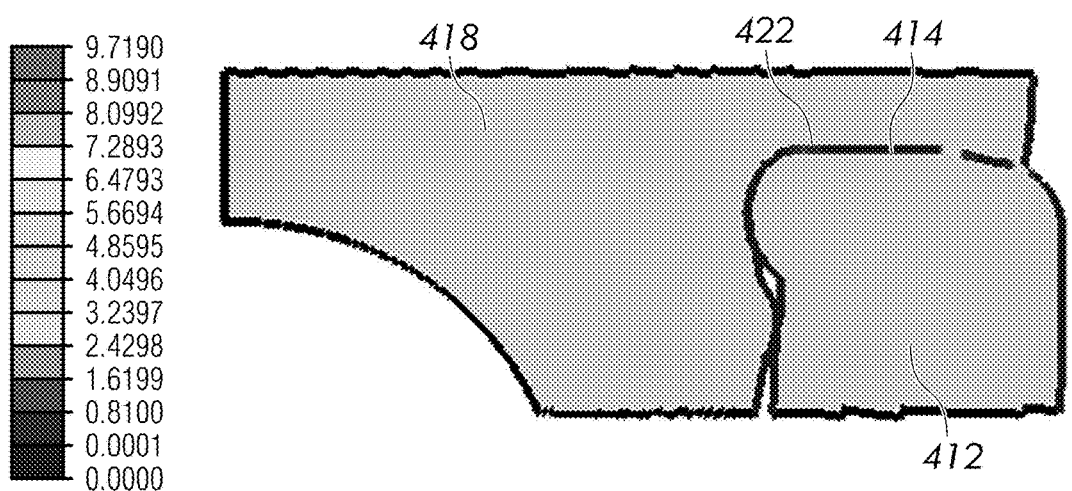
Figure 4C:
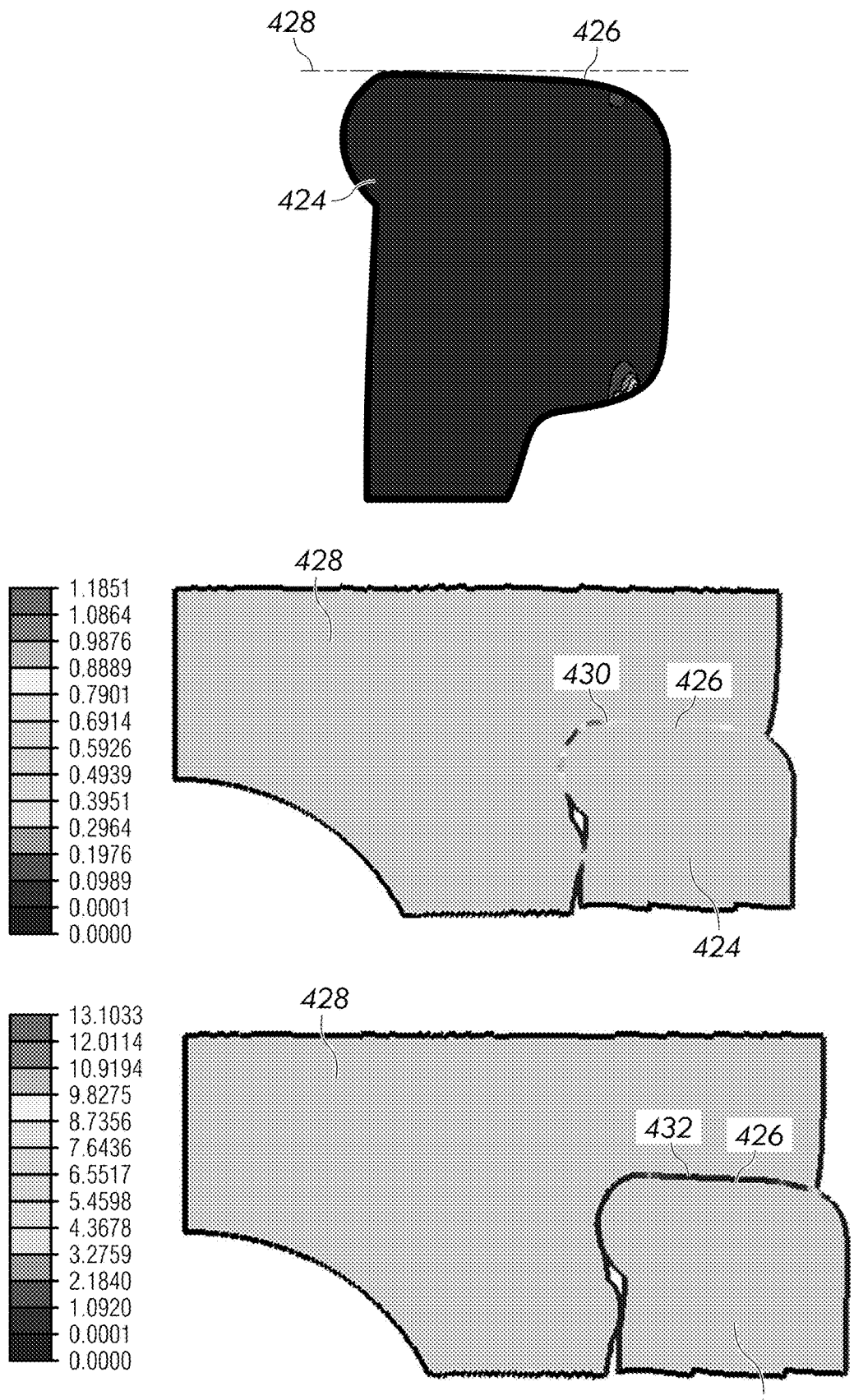
FIG. 4C depicts a simulation of compression of a stopper against a flange of a glass container at multiple storage temperatures, where the flange comprises a third flange angle, according to one or more embodiments described herein.
Figure 4D:
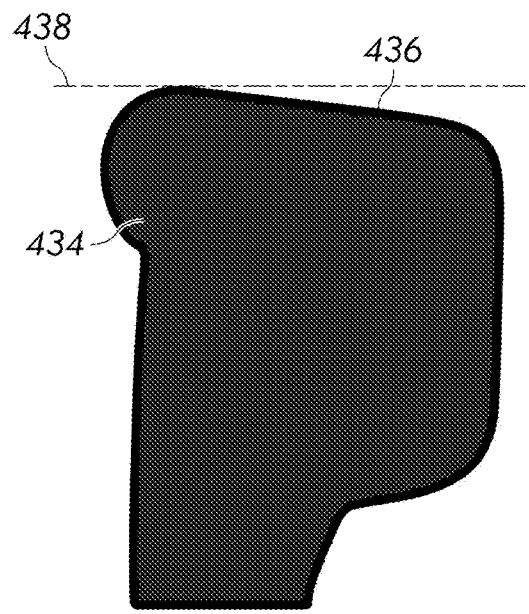
FIG. 4D depicts a simulation of compression of a stopper against a flange of a glass container at multiple storage temperatures, where the flange comprises a fourth flange angle, according to one or more embodiments described herein.
Figure 4D:
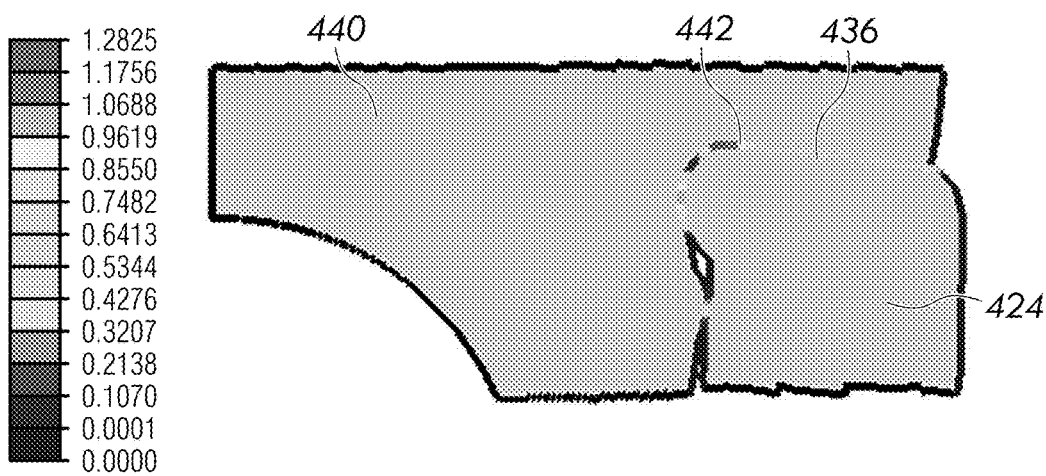
Figure 4D:
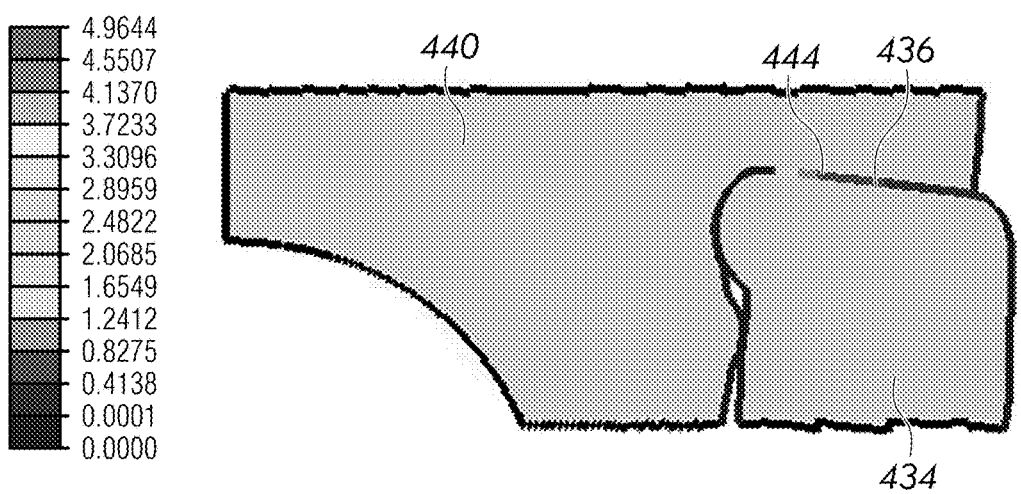

FIGS. 4A-4D depict simulations of stopper compression as a function of flange angle. FIG. 4A depicts simulated results of a flange 400 comprising an inclined sealing surface 402 extending at an angle of −3 degrees relative to a plane 404 lying on top of the flange 400 (see top portion of FIG. 4A). FIG. 4B depicts simulated results of a flange 412 comprising a sealing surface 414 extending at an angle of 0 degrees relative to a plane 416 lying on top of the flange 412 (see top portion of FIG. 4B). FIG. 4C depicts simulated results of a flange 424 comprising an inclined sealing surface 426 extending at an angle of 2.4 degrees relative to a plane 428 lying on top of the flange 424 (see top portion of FIG. 4C). FIG. 4D depicts simulation results of a flange 434 comprising an inclined sealing surface 436 extending at an angle of 7 degrees relative to a plane 438 lying on top of the flange 434 (see top portion of FIG. 4A).

The simulations predict the compression of stoppers 406, 418, 428, and 440 being inserted into the flanges 400, 412, 424, 434 depicted in FIGS. 4A, 4B, 4C, and 4D, respectively and crimped via an aluminum cap (not depicted) to provide a residual sealing force of approximately 25 lbf (e.g., greater than or equal to 24.8 lbf and less than or equal 25.6 lbf). Finite element analysis was then performed to simulate compression of the stoppers 406, 418, 428, and 440 at multiple temperatures. The middle portions of FIGS. 4A, 4B, 4C, and 4D depict the simulation results at room temperature (e.g., 25° C.). The stopper 406 of FIG. 4A being crimped against the flange 400 resulted in a compression profile 408 at 25° C. The stopper 418 of FIG. 4B being crimped against the flange 412 resulted in a compression profile 420 at 25° C. The stopper 428 of FIG. 4C being crimped against the flange 424 resulted in a compression profile 430 at 25° C. The stopper 440 of FIG. 4D being crimped against the flange 434 resulted in a compression profile 442 at 25° C. As depicted in each of the compression profiles 408, 420, 430, 442, each of the stoppers 406, 418, 428, and 440 is continuously pressed along a segment of each of the sealing surfaces 402, 414, 426, and 436 (e.g., the compression profiles 408, 420, 430, 442 contain segments without any gaps containing zero compression), indicating relatively large contact areas and the presence of a seal at 25° C.

The bottom portions of FIGS. 4A, 4B, 4C, and 4D depict the simulation results at a lower temperature of −80° C. The stopper 406 of FIG. 4A being crimped against the flange 400 resulted in a compression profile 410 at −80° C. The stopper 418 of FIG. 4B being crimped against the flange 412 resulted in a compression profile 422 at −80° C. The stopper 428 of FIG. 4C being crimped against the flange 424 resulted in a compression profile 432 at −80° C. The stopper 440 of FIG. 4D being crimped against the flange 434 resulted in a compression profile 444 at −80° C. Each of the compression profiles 410, 422, and 432 comprises at least one gap where the compression of the stopper is zero, indicating a reduced contact area and likelihood of a broken seal. That is, according to the simulation results, flanges having a flange angle of less than 5 degrees resulted reduced contact area at lower storage temperatures. The compression profile 444 of flange 436 depicted in FIG. 4D, in contrast, resulted in continuous compression of the stopper 440 at −80° C. That is, the compression profile 444 comprises a segment containing no gaps of zero compression at the inclined sealing surface 436, indicating seal maintenance at such temperatures.

Figure 4E:
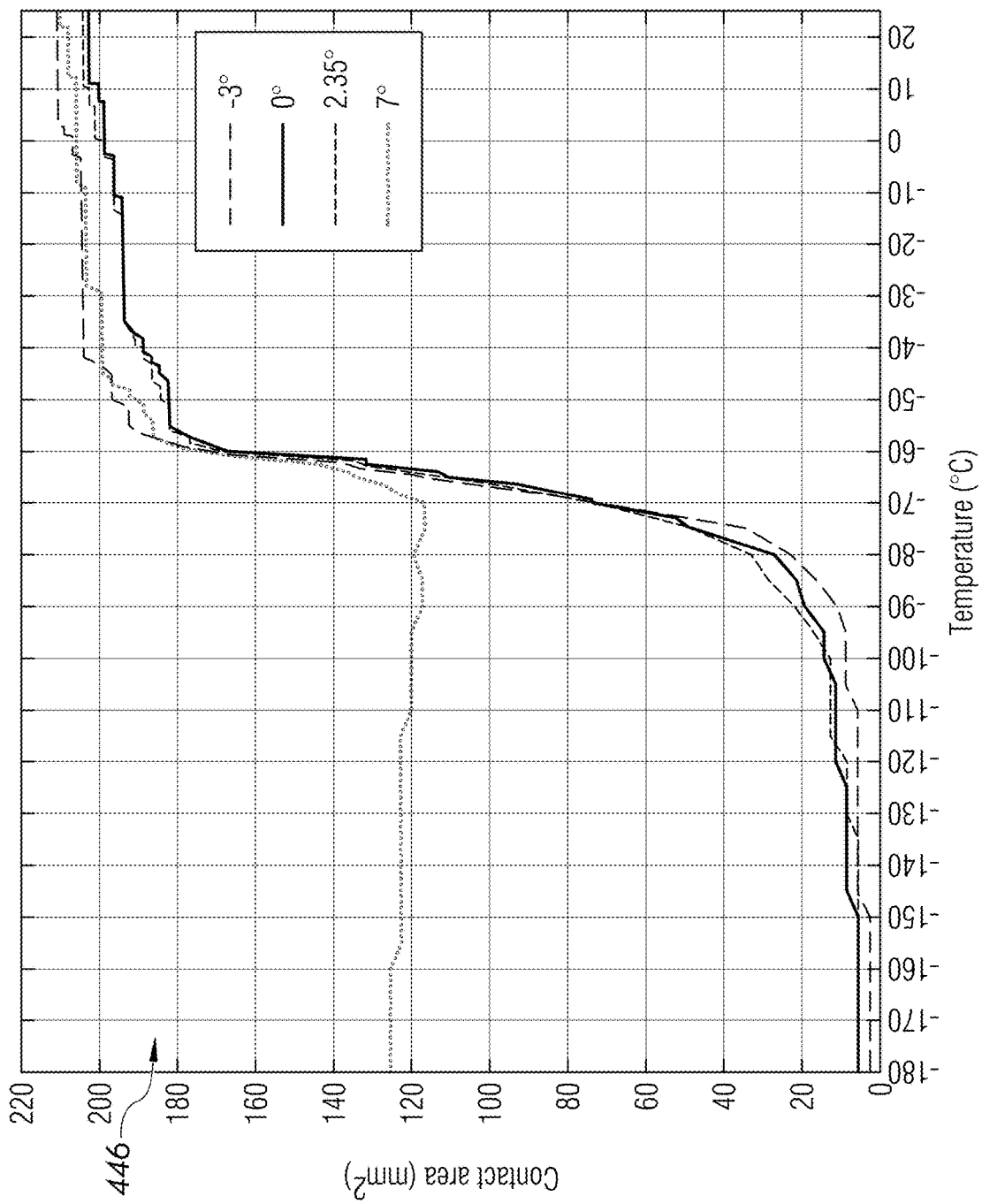
FIG. 4E depicts a plot of contact area between the flanges and stoppers depicted in FIGS. 4A-4D as a function of temperature when cooled at a first cooling rate, according to one or more embodiments described herein.
Figure 4F:
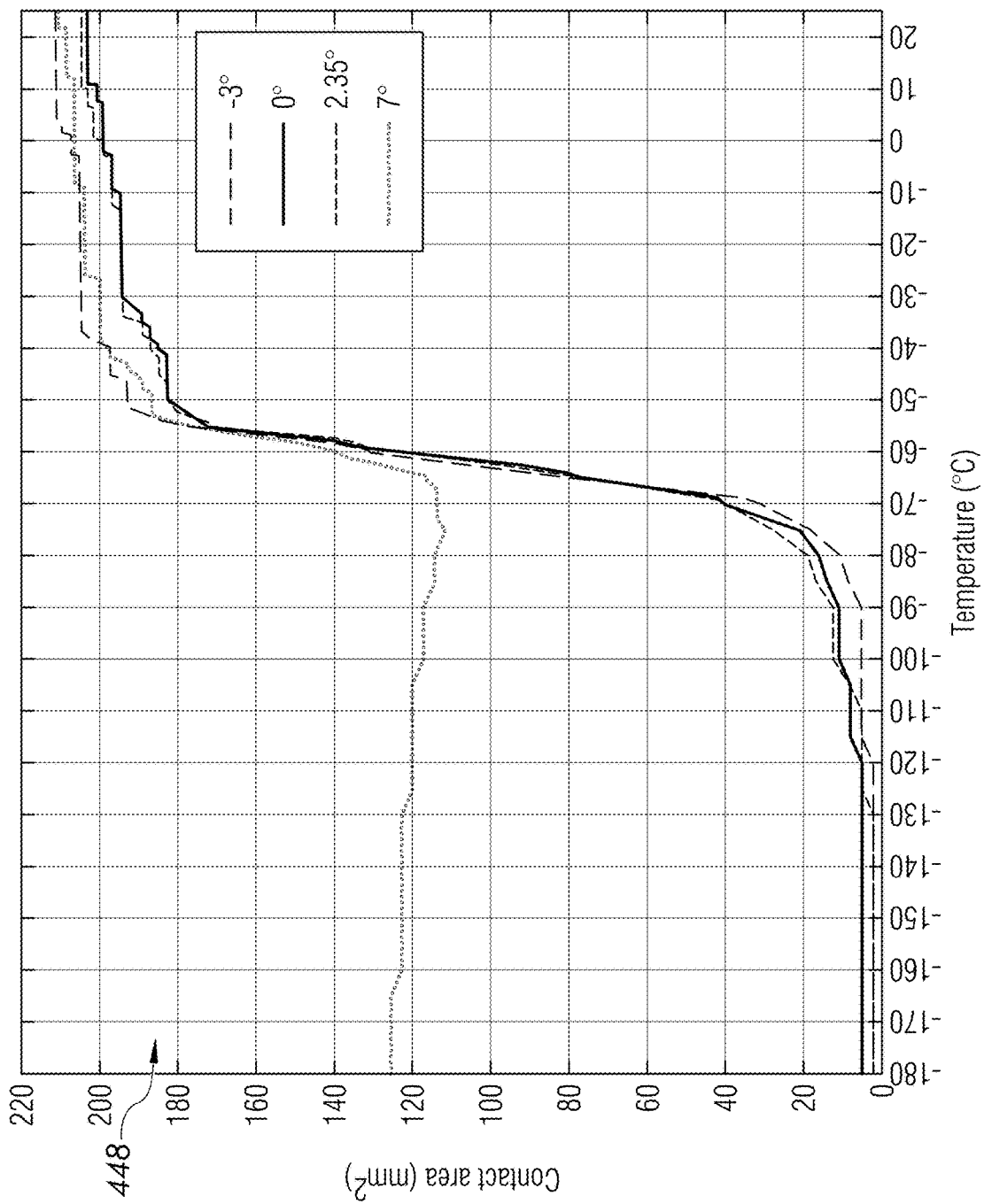
FIG. 4F depicts a plot of contact area between the flanges and stoppers depicted in FIGS. 4A-4D as a function of temperature when cooled at a second cooling rate, according to one or more embodiments described herein.

FIG. 4E depicts a plot 446 of stopper contact area with the flanges 400, 412, 424, 434 as a function of temperature when cooled at a rate of 1° C./minute. FIG. 4F depicts a plot 448 of stopper contact area with the flanges 400, 412, 424, 434 as a function of temperature when cooled at a rate of 5° C./minute. As depicted in FIG. 4E, when cooled at a rate of 1° C./minute, the flange 434 depicted in FIG. 4D, with a flange angle of 7 degrees, maintains a contact area at temperatures less than or equal to −70° C. that is at least 55% of a contact area at room temperature. The flange 434 also maintains such a contact area at temperatures of less than or equal to −100° C. (e.g., less than or equal to −110° C., less than or equal to −120° C., less than or equal to −130° C., less than or equal to −140° C., less than or equal to −170° C.). Such a result contrasts with the results for the flanges 400, 412, 424, having flange angles of less than or equal to 5° C., where the contact area is less than 40% at −70° C. as compared to 25° C., and further decreasing to below 10 percent at temperatures of less than −90° C. That is, the flange angle (e.g., the angle 150 described herein with respect to FIGS. 1A and 1B) possessing the values of greater than 5 degrees facilitates maintaining stopper contact area at low storage temperatures, indicating seal maintenance. The plot 448 depicted in FIG. 4F depicts a similar result, except that the stopper contact area appears to decrease at a greater rate than in the plot 446 (especially for the flanges 400, 412, and 424) as the glass is cooled. As such, cooling the glass containers described herein at rates of less than 5° C./minute may also facilitate seal maintenance.

In view of the foregoing description, it should be understood that sealed glass containers capable of maintaining container closure integrity at storage temperatures of less than or equal to −70° C. are disclosed. Depending on the implementation and the storage application, the structure of the glass container may be designed specifically to account for shrinkage of the sealing assembly during cooling for storage. For example, glass containers may include an inclined sealing surface extending at an angle of greater than 5 degrees relative to a plane resting on top of the glass container so as to increase compression of the stopper during the crimping process and therefore increase the tolerance for stopper shrinkage. Aspects of the sealing surface (e.g., surface roughness, flatness, other features such a chamfers or sealing features) may also be tailored to prevent the stopper from peeling off the sealing surface during shrinkage. Moreover, dimensions of the glass container (e.g., flange thickness) may also be increased to provide a greater probability of seal integrity maintenance. In addition to the structural modifications to the glass container, compositions of components of the sealing assembly (e.g., the cap, the stopper, any additional sealing materials) may be selected to ensure that the cap maintains an adequate amount of compression on the stopper to maintain placement of the stopper in the event of thermal shrinkage thereof.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A sealed pharmaceutical container comprising:
  a shoulder;
  a neck extending from the shoulder; and
  a flange extending from the neck, the flange comprising:
    an underside surface extending from the neck;
    an outer surface extending from the underside surface, the outer surface defining an outer diameter of the flange; and
    an inclined sealing surface extending between the outer surface and an inner surface defining an opening in the sealed pharmaceutical container, wherein the inclined sealing surface extends at an angle relative to a plane extending through an end of the opening such that a distance between the inclined sealing surface and the plane increases with decreasing radial distance from the outer surface;
a sealing assembly comprising a stopper extending over the inclined sealing surface of the flange and covering the opening, and a cap securing the stopper to the flange, wherein:
the stopper has a coefficient of thermal expansion (CTE) of less than or equal to $290 \times 10^{-7}$/K and a glass transition temperature ($T_g$) that is greater than or equal to $-70°$ C. and less than or equal to $-45°$ C.;
the cap is a metal-containing cap having a CTE of greater than or equal to $260 \times 10^{-7}$/K, wherein the metal-containing cap comprises a solid metal, a metallic alloy, or a polymer metal composite; and
the sealing assembly maintains a helium leakage rate of the sealed pharmaceutical container of less than or equal to $1.4 \times 10^{-6}$ cm$^3$/s as the sealed pharmaceutical container is cooled to a temperature of less than or equal to $-80°$ C.

2. The sealed pharmaceutical container of claim 1, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to $-100°$ C.

3. The sealed pharmaceutical container of claim 1, wherein the angle is greater than 5 degrees and less than or equal to 45 degrees.

4. The sealed pharmaceutical container of claim 1, wherein the inclined sealing surface comprises a surface roughness of less than or equal to 0.1 µm.

5. The sealed pharmaceutical container of claim 4, wherein the surface roughness of the inclined sealing surface is predetermined based at least in part on an estimated shrinkage of a sealing assembly associated with the glass container when the sealing assembly is cooled to temperatures less than or equal to $-80°$ C.

6. The sealed pharmaceutical container of claim 1, wherein the sealed pharmaceutical container comprises a glass composition having a coefficient of thermal expansion that is greater than or equal to $0 \times 10^{-7}$/K and less than or equal to $70 \times 10^{-7}$/K.

7. The sealed pharmaceutical container of claim 1, wherein the stopper comprises a radially heterogeneous composition.

8. The sealed pharmaceutical container of claim 1, wherein
the cap comprises a metal alloy comprising at least one metal selected from the group consisting of Zn, Mg, Al, Cu, Pb, Sn, and combinations of these; and
the metal alloy comprises less than 5 wt. % Al.

9. The sealed pharmaceutical container of claim 1, wherein the cap comprises a polymer-metal composite material.

10. The sealed pharmaceutical container of claim 1, further comprising a sealing material disposed between the cap and the stopper, the sealing material having a CTE of less than or equal to $50 \times 10^{-7}$/K.

11. A sealed pharmaceutical container comprising:
a shoulder;
a neck extending from the shoulder;
a flange extending from the neck;
an inner surface defining an opening extending through the neck and the flange; and
a sealing assembly, the sealing assembly comprising:
a stopper extending over an upper sealing surface of the flange and covering the opening; and
a metal-containing cap crimped to the flange, the metal-containing cap compressing the stopper against the upper sealing surface;
wherein:
the flange comprises an underside surface extending from the neck, an outer surface extending from the underside surface, and the upper sealing surface extending from the inner surface to the outer surface;
the outer surface defines an outer diameter of the flange;
the upper sealing surface comprising a length of at least 4 mm;
the flange comprises a flange height that constitutes at least 61% of a combined height of material enclosed by the metal-containing cap, wherein the material enclosed by the metal-containing cap includes the flange and a sealing portion of the stopper, wherein the sealing portion of the stopper is disposed between the upper sealing surface of the flange and the metal-containing cap; and
the compression is maintained on the upper sealing surface as the sealed pharmaceutical container is cooled to a temperature of less than or equal to $-80°$ C. such that a helium leakage rate of the sealed pharmaceutical container is less than or equal to $1.4 \times 10^{-6}$ cm$^3$/s at the temperature.

12. The sealed pharmaceutical container of claim 11, wherein the upper sealing surface comprises an inclined sealing surface extending at an angle relative to a plane extending through an end of the opening such that a distance between the inclined sealing surface and the plane increases with decreasing radial distance from the outer surface, wherein the angle is less than or equal to 45 degrees.

13. The sealed pharmaceutical container of claim 11, wherein the portion extends at an angle relative to the inner surface that is greater than or equal to 89.5 degrees and less than or equal to 90.5 degrees.

14. The sealed pharmaceutical container of claim 11, wherein the sealed pharmaceutical container comprises a glass composition having a coefficient of thermal expansion that is greater than or equal to $0 \times 10^{-7}$/K and less than or equal to $70 \times 10^{-7}$/K.

15. The sealed pharmaceutical container of claim 11, wherein a difference between a coefficient of thermal expansion ("CTE") of the metal-containing cap and a CTE of the stopper is less than or equal to $50 \times 10^{-7}$/K.

16. The sealed pharmaceutical container of claim 15, wherein the CTE of the metal-containing cap is greater than or equal to $250 \times 10^{-7}$/K.

17. The sealed pharmaceutical container of claim 11, wherein a CTE of the stopper is less than or equal to $290 \times 10^{-7}$/K.

18. The sealed pharmaceutical container of claim 17, wherein the stopper comprises a polymer composite comprising greater than 0 wt. % and less than or equal to 30 wt. % of a silicon-based filler material having an average particle size of from 10 nm to 100 nm.

19. The sealed pharmaceutical container of claim 18, wherein the silicon-based filler material comprises $SiO_2$ glass particles.

20. The sealed pharmaceutical container of claim 18, wherein the silicon-based filler comprises a silicate.

21. The sealed pharmaceutical container of claim 11, wherein a glass transition temperature of the stopper is less than or equal to $-75°$ C.

22. The sealed pharmaceutical container of claim 11, wherein a glass transition temperature of the stopper is greater than or equal to −70° C. and less than or equal to −45° C.

23. The sealed pharmaceutical container of claim 11, wherein the stopper comprises a radially heterogeneous composition.

24. The sealed pharmaceutical container of claim 23, wherein the stopper comprises a low $T_g$ segment in contact with the upper sealing surface, wherein the low $T_g$ segment refers to a segment of the stopper comprising a low $T_g$ elastomer having a glass transition temperature ($T_g$) that is less than or equal to −75° C.

25. The sealed pharmaceutical container of claim 24, wherein the low $T_g$ elastomer is selected from the group consisting of a polybutadiene, silicone, a fluorosilicone, a nitrite, an EPDM elastomer, and combinations of these.

26. The sealed pharmaceutical container of claim 11, wherein the sealed pharmaceutical container maintains the helium leakage rate of less than or equal to $1.4 \times 10^{-6}$ cm$^3$/s as it is cooled to the temperature at a rate of less than or equal to 5° C. per minute.

27. The sealed pharmaceutical container of claim 11, wherein the metal-containing cap maintains continuous compression of the stopper against the flange as the sealed pharmaceutical container is cooled.

28. The sealed pharmaceutical container of claim 11, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to −100° C.

29. The sealed pharmaceutical container of claim 11, wherein the sealing assembly maintains the helium leakage rate of the sealed pharmaceutical container of less than or equal to $1.4 \times 10^{-6}$ cm$^3$/s as the sealed pharmaceutical container is cooled to a temperature of less than or equal to −120° C.

* * * * *